United States Patent
Huang et al.

(10) Patent No.: US 12,279,258 B2
(45) Date of Patent: Apr. 15, 2025

(54) NETWORK NODES AND METHODS FOR HANDLING RESOURCE CONFIGURATIONS

(71) Applicant: Telefonaktiebolaget LM Ericsson (publ), Stockholm (SE)

(72) Inventors: Yezi Huang, Täby (SE); Oumer Teyeb, Solna (SE); Ajmal Muhammad, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 657 days.

(21) Appl. No.: 17/438,564

(22) PCT Filed: Feb. 10, 2020

(86) PCT No.: PCT/SE2020/050128
§ 371 (c)(1),
(2) Date: Sep. 13, 2021

(87) PCT Pub. No.: WO2020/204776
PCT Pub. Date: Oct. 8, 2020

(65) Prior Publication Data
US 2022/0167331 A1  May 26, 2022

Related U.S. Application Data

(60) Provisional application No. 62/825,841, filed on Mar. 29, 2019.

(51) Int. Cl.
*H04W 72/20* (2023.01)
(52) U.S. Cl.
CPC ................... *H04W 72/20* (2023.01)
(58) Field of Classification Search
None
See application file for complete search history.

(56) References Cited

U.S. PATENT DOCUMENTS

2018/0368109 A1* 12/2018 Kim ................. H04W 72/04
2019/0053317 A1* 2/2019 Hampel ............ H04W 76/27
(Continued)

FOREIGN PATENT DOCUMENTS

CN 105684543 A 6/2016
CN 109525993 A 3/2019
(Continued)

OTHER PUBLICATIONS

International Search Report and Written Opinion dated Apr. 15, 2020 for International Application No. PCT/SE2020/050128 filed Feb. 10, 2020, consisting of 14-pages.
(Continued)

*Primary Examiner* — Otis L Thompson, Jr.
(74) *Attorney, Agent, or Firm* — Weisberg I.P. Law, P.A.

(57) ABSTRACT

The present disclosure relates in general to cellular radio network communication. In one of its aspects, the technology presented herein concerns a method performed by a network node in a wireless communication system for handling resource configurations for network nodes in an Integrated Access and Backhaul (IAB) network. The network node is connected to a core network of the wireless communications system and to at least one radio network node. The method includes providing, to a first radio network node and to at least one second radio network node, a message indicating a resource configuration for the first radio network node. The at least one second radio network node is a parent node to the first radio network node and the first radio network node is a child node to the at least one second radio network node.

9 Claims, 16 Drawing Sheets

(56) References Cited

U.S. PATENT DOCUMENTS

| | | | |
|---|---|---|---|
| 2019/0159277 A1* | 5/2019 | Zhu | H04L 45/16 |
| 2020/0145965 A1* | 5/2020 | Luo | H04W 72/21 |
| 2020/0145993 A1* | 5/2020 | Abedini | H04L 5/0094 |
| 2020/0146099 A1* | 5/2020 | Abedini | H04W 72/0446 |
| 2020/0170010 A1* | 5/2020 | Luo | H04W 72/0446 |
| 2020/0344843 A1* | 10/2020 | Zhu | H04W 40/22 |
| 2020/0413457 A1* | 12/2020 | Hong | H04W 76/10 |
| 2021/0045036 A1* | 2/2021 | Wei | H04L 45/24 |
| 2021/0068183 A1* | 3/2021 | Xu | H04W 76/27 |
| 2021/0298000 A1* | 9/2021 | Park | H04L 5/0098 |
| 2021/0345285 A1* | 11/2021 | Tenny | H04W 64/00 |
| 2021/0360496 A1* | 11/2021 | Ishii | H04W 36/362 |
| 2021/0377805 A1* | 12/2021 | Liu | H04W 72/21 |
| 2021/0377980 A1* | 12/2021 | Fujishiro | H04W 88/14 |
| 2021/0400660 A1* | 12/2021 | Wei | H04W 80/02 |
| 2021/0409328 A1* | 12/2021 | Xu | H04L 45/74 |
| 2022/0015000 A1* | 1/2022 | Fujishiro | H04W 40/24 |
| 2022/0038164 A1* | 2/2022 | Wei | H04L 5/0051 |
| 2022/0078740 A1* | 3/2022 | Harada | H04W 56/0045 |
| 2022/0150889 A1* | 5/2022 | Wei | H04W 72/0446 |
| 2022/0159676 A1* | 5/2022 | Wei | H04W 72/23 |
| 2022/0191863 A1* | 6/2022 | Miao | H04L 5/0053 |
| 2024/0163771 A1* | 5/2024 | Wei | H04W 40/04 |

FOREIGN PATENT DOCUMENTS

| | | | |
|---|---|---|---|
| WO | 2014182229 A1 | 11/2014 | |
| WO | 2018175817 A1 | 9/2018 | |

OTHER PUBLICATIONS

3GPP TR 38.874 V1.0.0; 3rd Generation Partnership Project; Technical Specification Group Radio Access Network; Study on Integrated Access and Backhaul; (Release 15); Dec. 2018, consisting of 16-pages.

3GPP TSG RAN WG1 Meeting #94bis R1-1810273; Title: Discussions on mechanisms to support NR IAB scenarios; Agenda Item: 7.2.3.3; Source: LG Electronics; Document for: Discussion and decision; Date and Location: Oct. 8-12, 2018, Chengdu, China, consisting of 7-pages.

3GPP TSG-RAN WG1 Meeting #96 R1-1902412; Title: IAB resource configuration and assignment; Agenda Item: 7.2.3.4; Source: Ericsson; Document for: Decision; Date and Location: Feb. 25-Mar. 1, 2019, Athens, Greece, consisting of 6-pages.

3GPP TSG-RAN WG2 #105 R1-1900919; Title: Consideration of topology adaptation upon BH RLF; Agenda Item: 11.1.3; Source: Kyocera; Document for: Discussion; Date and Location: Feb. 25-Mar. 1, 2019, Athens, Greece, consisting of 4-pages.

3GPP TSG-RAN WG1 Meeting #96bis R1-1904834; Title: IAB resource configuration and coordination; Agenda Item: 7.2.3.3; Source: Ericsson; Document for: Discussion; Date and Location: Apr. 8-12, 2019, Xi'an, China, consisting of 7-pages.

Chinese Office Action and Search Report with English summary translation dated Jan. 25, 2024 for Patent Application No. 202080027472. X, consisting of 16 pages.

* cited by examiner

NETWORK NODES AND METHODS FOR HANDLING RESOURCE CONFIGURATIONS

CROSS-REFERENCE TO RELATED APPLICATIONS

This application is a Submission Under 35 U.S.C. § 371 for U.S. National Stage Patent Application of International Application No.: PCT/SE2020/050128, filed Feb. 10, 2020 entitled "RESOURCE ALIGNMENT AT A CHILD NODE AND AT A PARENT NODE OF AN INTEGRATED ACCESS AND BACKHAUL NETWORK," which claims priority to U.S. Provisional Application No. 62/825,841, filed Mar. 29, 2019, the entireties of both of which are incorporated herein by reference.

TECHNICAL FIELD

Embodiments herein relate to network nodes and methods for handling resource configuration for a radio network node in a communications network.

BACKGROUND

This section is intended to provide a background to the various embodiments of the invention that are described in this disclosure. Therefore, unless otherwise indicated herein, what is described in this section should not be interpreted to be prior art by its mere inclusion in this section.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to Radio Network Controllers (RNCs) used in 3G networks. In general, in E-UTRAN/LTE the functions of a 3G RNC are distributed between the radio network nodes, e.g. eNodeBs in LTE or gNBs in 5G, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In a typical wireless communication network, User Equipment (UE), also known as wireless devices, wireless communication devices, mobile stations, and/or stations (STA) communicate via a Local Area Network (LAN) such as a Wi-Fi network or a Radio Access Network (RAN) to one or more Core Networks (CN). The RAN covers a geographical area which is divided into service areas or cell areas, which may also be referred to as a beam or a beam group, with each service area or cell area being served by a radio network node such as a radio access node e.g., a Wi-Fi access point or a Radio Base Station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Densification via a deployment of more and more base stations (be them macro or micro base stations) is one of the mechanisms that may be employed to satisfy the ever-increasing demand for more and more bandwidth and/or capacity in mobile networks. Due to the availability of more spectrum in the millimeter wave (mmw) band, deploying small cells that operate in this band is an attractive deployment option for these purposes. However, deploying fiber cables to such small cells, which is the usual way in which small cells are deployed, can end up being very expensive and impractical. Thus, employing a wireless link for connecting the small cells to an operator's network may be a cheaper and more practical alternative. One such solution is an Integrated Access and Backhaul (IAB) network, where the operator may utilize part of the radio resources for the backhaul link.

Integrated access and backhaul has been studied earlier in 3GPP in the scope of LTE Rel-10. In that work, an architecture was adopted where a Relay Node (RN) has the functionality of an LTE eNB and a UE modem. The RN is connected to a donor eNB, which has a S1/X2 proxy functionality hiding the RN from the rest of the network. That architecture enables the donor eNB to also be aware of the UEs behind the RN and hide any UE mobility between the donor eNB and the Relay Node on the same donor eNB from the CN.

During the work with 3GPP Rel-10 also other architectures were considered, such as e.g. where the RNs are more transparent to the Donor gNB and are allocated a separate stand-alone Packet Data Network-Gateway (P-GW) and/or Serving-Gateway (S-GW) node.

For NR, a similar architecture option may also be considered. One potential difference compared to LTE, besides lower layer differences, is that a gNB-Centralized Unit/Distributed Unit (CU/DU) split is defined for NR, which allows a separation of time critical protocols, such as Radio Link Control (RLC), Medium Access Control (MAC) and/or Physical layer (PHY) protocols, from less time critical protocols, such as Radio Resource Control (RRC) protocol and/or Packet Data Convergence Protocol (PDCP). Such a split may also be applied for the IAB case. Other differences anticipated in NR as compared to LTE with regards to IAB are a support of multiple hops as well as a support of redundant paths.

SUMMARY

It is in view of the above and other considerations that the various embodiments of the present disclosure have been made.

In view of the above, it is a general object of the aspects and embodiments described throughout this disclosure to provide a solution of how to inform Integrated Access and Backhaul (IAB) nodes about resource configurations of other IAB nodes to enable efficient utilization of spectrum resources in an IAB network.

This general object has been addressed by the appended independent claims. Advantageous embodiments are defined in the appended dependent claims.

According to a first aspect, there is provided a method, performed by a network node in a wireless communication system, for handling resource configurations for network nodes in an IAB network.

The network node is connected to a core network of the wireless communications system and to at least one radio network node. The method comprises providing, to a first radio network node and to at least one second radio network node, a message indicating a resource configuration for the first radio network node. The at least one second radio network node is a parent node to the first radio network node and the first radio network node is a child node to the at least one second radio network node.

In one embodiment, the network node has a wired connection to the core network of the wireless communication system and a wireless connection to the at least one radio network node.

In one embodiment, the step of providing the message indicating the resource configuration for the first radio network node comprises sending, to the first radio network node, a resource indication message comprising the resource configuration for the first radio network node. The method further comprises sending, to the at least one second radio network node, a resource indication message comprising the resource configuration for the first radio network node. The resource indication message sent to the at least one second radio network node may comprise an information element indicating that the resource configuration concerns the first radio network node.

In one embodiment, the resource indication message is an application protocol message, which is sent over an F1 interface.

In one embodiment, the step of providing the message indicating the resource configuration for the first radio network node comprises embedding a message comprising the resource configuration for the first radio network node in at least one of the message which is to be sent to the at least one second radio network node. The embedded message is to be forwarded to the first radio network node by the at least one second radio network node. The method further comprises sending, to the at least one second radio network node, the message comprising the embedded message. Both the embedded message and the at least one message comprising the embedded message may comprise the resource configuration for the first radio network node.

In one embodiment, the at least one message comprising the embedded message is an application protocol message, which is sent over an F1 interface, and the embedded second message is a Radio Resource Control (RRC) message. The embedded message may be, for example, embedded in a transparent container in the at least one message.

In one embodiment, the at least one message is sent by means of a Centralized Unit (CU) of the network node.

According to a second aspect, there is provided a method, performed by a second radio network node in a wireless communication system, for handling resource configurations for network nodes in an IAB network.

The second radio network node is connected to at least one radio network node and to a network node connected to a core network of the wireless communications system. The method comprises receiving, from the network node, a message indicating a resource configuration for a first radio network node of the at least one radio network node. The first radio network node is a child node of the second radio network node.

In one embodiment, the method further comprises storing the received resource configuration of the first radio network node.

In one embodiment, the received message is a resource indication message comprising an information element indicating that the resource configuration concerns the first radio network node.

In one embodiment, the received message comprises an embedded message to be forwarded to the first radio network node. The embedded message comprises the resource configuration for the first radio network node. The method further comprises sending, to the first radio network node, the embedded message comprising the resource configuration for the first radio network node. Both the received message and the embedded message may comprise the resource configuration for the first radio network node.

In one embodiment, the received message is an application protocol message received over an F1 interface and the embedded message is an RRC message.

In one embodiment, the embedded message is embedded in a transparent container in the received message. The method may further comprise encapsulating the embedded message in an adaption header comprising header information according to the F1 interface prior to sending the embedded message to the first radio network node.

In one embodiment, the embedded message is sent to the first radio network node by means of a Distributed Unit (DU) of the second radio network node.

In one embodiment, the received message is received from the network node by means of a DU of the second radio network node.

According to a third aspect, there is provided a method, performed by a first radio network node in a wireless communication system, for handling resource configurations for network nodes in an IAB network.

The first radio network node is connected to at least one second radio network node of the wireless communication system. The method comprises receiving, from at least one of the at least one second radio network node, a resource indication message comprising the resource configuration for the first network node.

In one embodiment, the method further comprises applying the resource configuration.

In one embodiment, the received message is an RRC message. The received RRC message may be encapsulated in an adaption header comprising header information according to the F1 interface, such that the first radio network node handles the RRC message as an application protocol message received over an F1 interface.

In one embodiment, the resource configuration message is received from the at least one second radio network node by means of a Mobile Termination (MT) unit of the first network node.

In one embodiment, the changed resource configuration for the first radio network node is a resource configuration for a DU of the first radio network node.

According to a fourth aspect, there is provided a network node in a wireless communication system, for handling resource configurations for network nodes in an IAB network.

The network node is connected to a core network of the wireless communications system and to at least one radio network node. The network node is configured to provide, to a first network node and to at least one second radio network node, a message indicating a resource configuration for the first radio network node. The at least one second radio network node is a parent node to the first radio network node and the first radio network node is a child node to the at least one second radio network node.

In one embodiment, the network node has a wired connection to the core network of the wireless communication system and a wireless connection to the at least one radio network node.

In one embodiment, the network node is further configured to provide the message indicating the resource configuration for the first radio network node by to sending, to the first radio network node, a resource indication message comprising the resource configuration for the first radio network node. The network node is further configured to send, to the at least one second radio network node, a resource indication message comprising the resource configuration for the first radio network node.

In one embodiment, the resource indication message sent to the at least one second radio network node comprises an information element indicating that the resource configuration concerns the first radio network node.

In one embodiment, the network node is configured to send the at least one sent resource indication message as an application protocol message sent over an F1 interface.

In one embodiment, the network node is configured to embed a message comprising the resource configuration for the first radio network node in at least one of the message which is to be sent to the at least one second radio network node. The embedded message is to be forwarded to the first radio network node by the at least one second radio network node. The network node is further configured to send, to the at least one second radio network node, the message comprising the embedded message. Both the embedded message and the at least one message comprising the embedded message may comprise the resource configuration for the first radio network node.

In one embodiment, the network node is configured to send the at least one message comprising the embedded message as an application protocol message sent over an F1 interface and the embedded second message as a RRC message.

In one embodiment, the network node is configured to embed the message in a transparent container in the at least one message sent to the at least one second radio network node.

In one embodiment, the network node is configured to send the message by means of a CU of the network node.

According to a fifth aspect, there is provided a second radio network node in a wireless communication system, for handling resource configurations for network nodes in an IAB network.

The second radio network node is connected to at least one radio network node and to a network node connected to a core network of the wireless communications system. The second radio network node is configured to receive, from the network node, a message indicating a resource configuration for a first radio network node of the at least one radio network node. The first radio network node is a child node of the second radio network node.

In one embodiment, the second radio network node is further configured to store the received resource configuration of the first radio network node.

In one embodiment, the received message comprises an information element indicating that the resource configuration concerns the first radio network node.

In one embodiment, the received message comprises an embedded message to be forwarded to the first radio network node. The embedded message comprises the resource configuration for the first radio network node. The second radio network node is further configured to send, to the first radio network node, the embedded message comprising the resource configuration for the first radio network node. Both the received message and the embedded message may comprise the resource configuration for the first radio network node.

In one embodiment, the second radio network node is configured to receive the message as an application protocol message received over an F1 interface and the embedded message may be an RRC message.

In one embodiment, the second radio network node is configured to receive the embedded message in a transparent container in the received message. The second radio network node may further be configured to encapsulate the embedded message in an adaption header comprising header information according to the F1 interface prior to sending the embedded message to the first radio network node.

In one embodiment, the second radio network node is configured to send the embedded message to the first radio network node by means of a DU of the second radio network node.

In one embodiment, the second radio network node is configured to receive the message from the network node by means of a DU of the second radio network node.

According to a sixth aspect, there is provided a first radio network node in a wireless communication system, for handling resource configurations for network nodes in an IAB network.

The first radio network node is connected to at least one second radio network node of the wireless communication system. The first radio network node is configured to receive, from at least one of the at least one second radio network node, a resource indication message comprising the resource configuration for the first network node.

In one embodiment, the first radio network node is further configured to apply the resource configuration.

In one embodiment, the first radio network node is configured to receive the resource indication message as an RRC message from the at least one second radio network node. The first radio network node may be configured to receive the RRC message from the at least one second radio network node encapsulated in an adaption header comprising header information according to the F1 interface, such that the first radio network node handles the RRC message as an application protocol message received over an F1 interface.

In one embodiment, the first radio network node is configured to receive the resource configuration message from the at least one second radio network node by means of a MT unit of the first network node.

According to a seventh aspect, there is provided a computer program comprising instructions, which when executed by a processor, causes the processor to perform actions according to any of the first, second and third aspects.

According to an eight aspect, there is provided a carrier comprising the computer program of the seventh aspect. The carrier is one of an electronic signal, an optical signal, an electromagnetic signal, a magnetic signal, an electric signal, a radio signal, a microwave signal, or a computer-readable storage medium.

The various embodiments proposed herein provide solutions for informing IAB nodes about the resource configuration of their child IAB nodes to enable efficient utilization of spectrum resources in an IAB network. That way, the parent IAB nodes may control the resource utilization of the links to their different child nodes, ensuring that DL transmissions/UL grants will not be provided during those time-domain resources where the child nodes are not able to utilize them.

DETAILED DESCRIPTION

Figure 1:
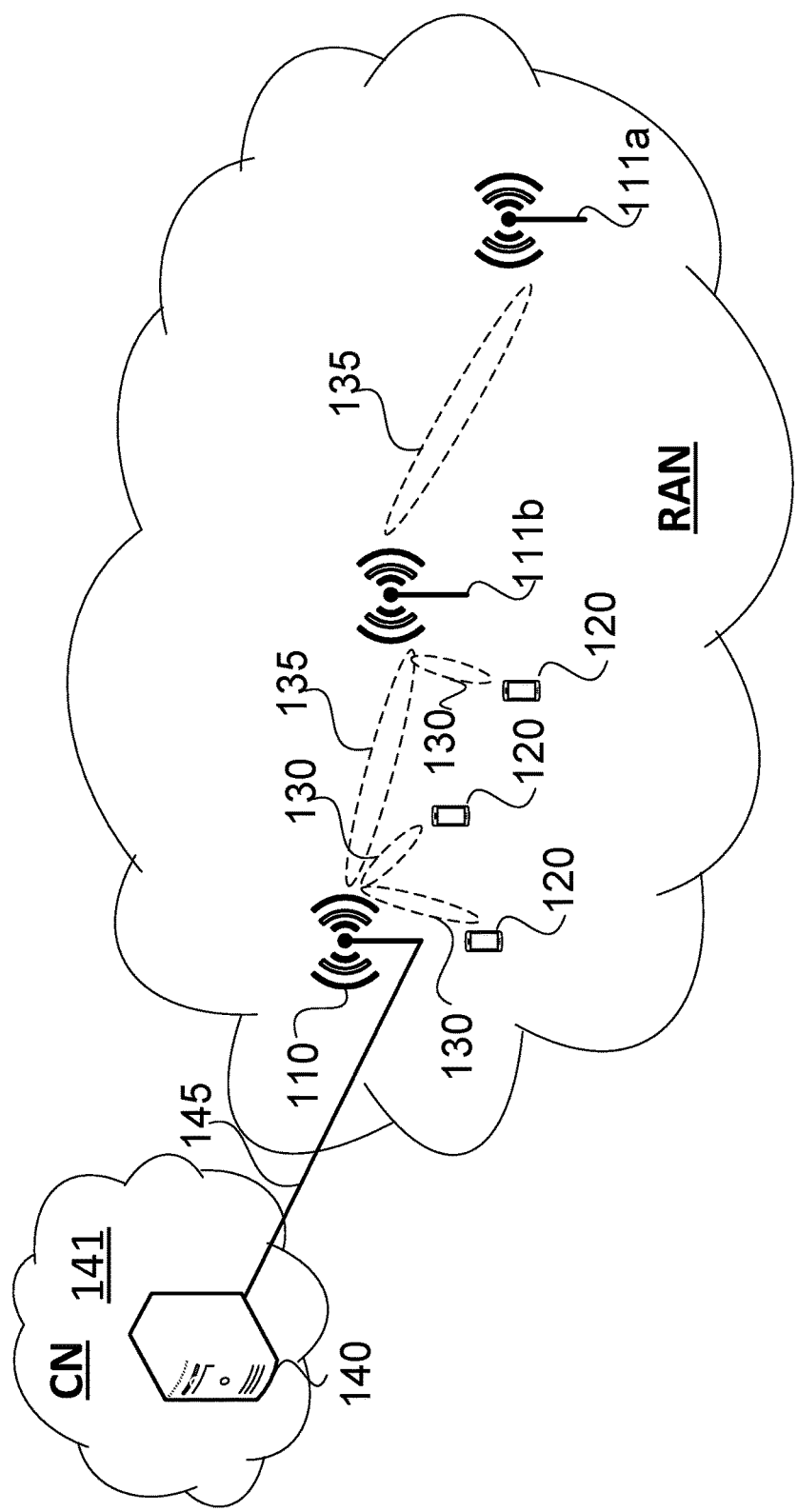
FIG. 1 illustrates an embodiment of a wireless communications network.

FIG. 1 depicts an example of a communications network 100 according to a first scenario in which embodiments herein may be implemented. The communications network 100 is a wireless communication network such as e.g. an LTE, E-Utran, WCDMA, GSM network, any 3GPP cellular network, Wimax, or any cellular network or system.

The communications network 100 comprises a Radio Access Network (RAN) and a Core Network (CN). The communication network 100 may use a number of different technologies, such as Long Term Evolution (LTE), LTE-Advanced, 5G, Wideband Code Division Multiple Access (WCDMA), Global System for Mobile communications/Enhanced Data rate for GSM Evolution (GSM/EDGE), MuLTEfire, Worldwide Interoperability for Microwave Access (WiMax), Wi-Fi, or Ultra Mobile Broadband (UMB), just to mention a few possible implementations. In the communication network 100, a set of one or more UEs 120 may communicate via one or more Access Networks (AN), e.g. RAN, to one or more CNs. The UE 120 may e.g. be a wireless device (WD), a mobile station, a non-access point (non-AP) STA, a STA, and/or a wireless terminal. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets, industrial cellular gateway, industrial device, industrial modem or even a base station communicating within a cell.

The RAN comprises a set of radio network nodes, such as radio network nodes 110, 111 each providing radio coverage over one or more geographical areas, such as a cell or a beam 130 of a radio access technology (RAT), such as 5G, LTE, UMTS, Wi-Fi or similar. The radio network node 110, 111 may be a radio access network node such as radio network controller or an access point such as a wireless local area network (WLAN) access point or an Access Point Station (AP STA), an access controller, a base station, e.g. a radio base station such as a gNB, a NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area or a beam, served by the radio network node 110, 111 depending e.g. on the first radio access technology and terminology used.

The CN further comprises a core network node 140, such as a New Generation Core (NGC) which is configured to communicate with the radio network nodes 110, 111, via e.g. an S1 interface. The core network node may e.g. be a Mobile Switching Centre (MSC), a Mobility Management Entity (MME), an Operations & Management (O&M) node, an Operation, Administration and Maintenance (OAM) node, an Operations Support Systems (OSS) node and/or a Self-Organizing Network (SON) node. The core network node 140 may further be a distributed node comprised in a cloud 141.

The UE 120 may be located in the cell or beam 130 of one of the network nodes 110, 111, which is referred to as the serving cell, whereas the cell or beam of the neighboring network nodes 110, 111 are referred to as neighboring cells.

Note that although terminology from 3GPP 5G has been used in this disclosure to exemplify the embodiments herein, this should not be seen as limiting the scope of the embodiments herein to only the aforementioned system. Other wireless systems, including WCDMA, WiMax, UMB, GSM network, MuLTEfireany 3GPP cellular network or any cellular network or system, may also benefit from exploiting the ideas covered within this disclosure.

In FIG. 1, an IAB deployment of the communications network is presented, where the network node 110 is an IAB donor node (in short IAB donor) and has a wired connection 145 to the core network. One or more radio network nodes 111 are IAB relay nodes (in short IAB nodes) that are wirelessly connected using NR to the IAB donor, either directly, such as a second radio network node 111b, or indirectly via another IAB node, such as is the case for the first radio network node 111a. The connection between IAB donor and/or nodes and UEs may herein be referred to as an access link 130, whereas the connection between two IAB nodes, such as IAB node 1, 111b, and IAB node 2, 111a, shown in FIG. 1, or between an IAB donor and an IAB node may be referred to as a backhaul link 135. The deployment shown in FIG. 1 may be referred to as a multi-hop deployment in the IAB network.

Figure 2:
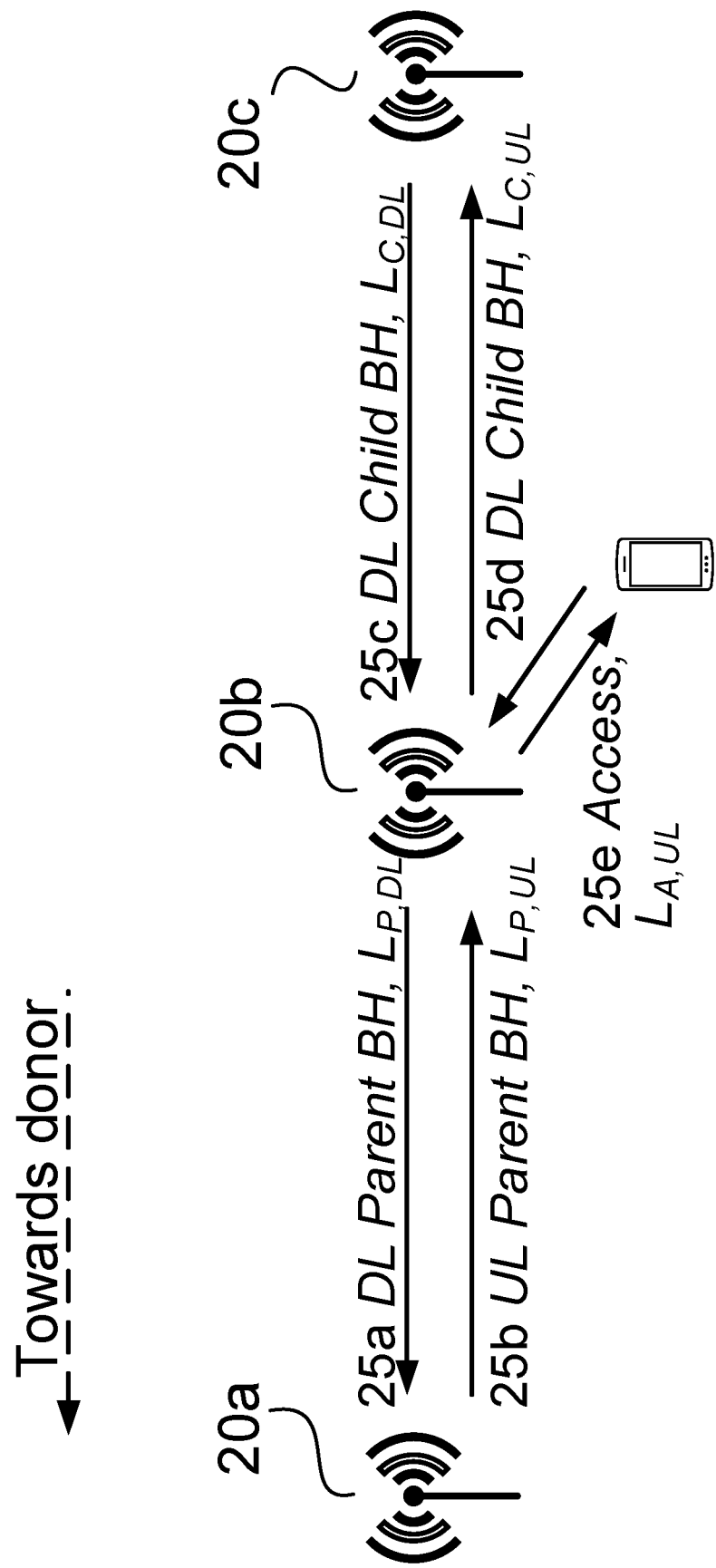
FIG. 2 illustrates IAB terminologies used in adjacent hops.

Furthermore, as shown in FIG. 2, an adjacent upstream node which is closer to the IAB donor node of an IAB node 20b may be referred to as a parent node 20a of the IAB node 20b. An adjacent downstream node 20c which is further away from the IAB donor node of an IAB node 20b may be referred to as a child node 20c of the IAB node 20b. The backhaul link between the parent node and the IAB node may be referred to as a parent (backhaul) link 25a, 25b, whereas the backhaul link between the IAB node and the child node may be referred to as a child (backhaul) link 25c, 25d. Hence, in the scenario depicted in FIG. 1 the first radio network node 111a is a child node of the second radio network node 111b and the second radio network node 111b is a parent node of the first radio network node 111a.

Integrated Access Backhaul Architectures

Figure 3:
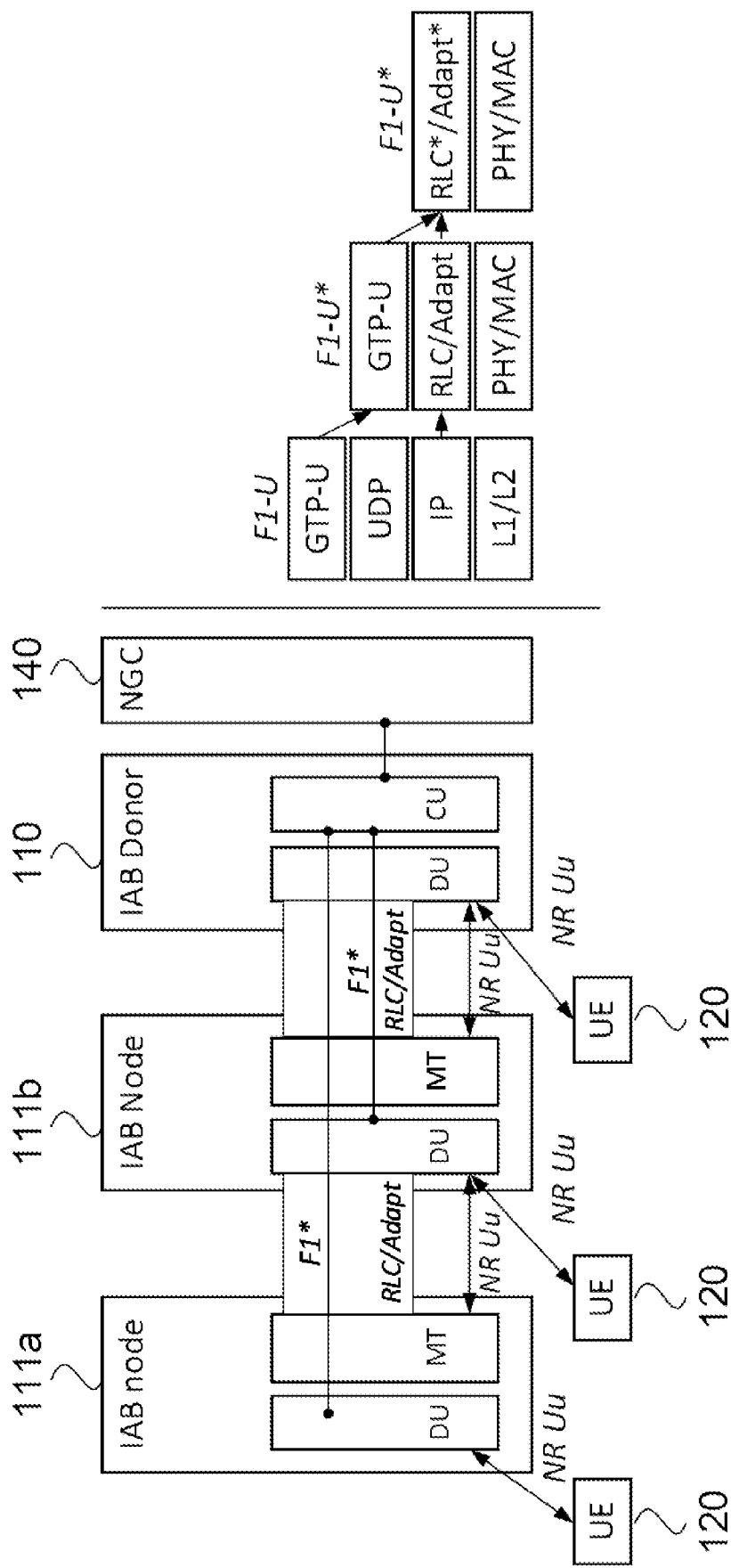
FIG. 3 is a schematic block diagram illustrating a network architecture 1a (SA-mode with NGC)

Currently in 3GPP, different architectures for supporting user plane traffic over IAB node have been captured in 3GPP TS 38.874 version 1.0.0, namely architecture groups 1 and 2. A first of these architectures, which is referred to as architecture 1a (SA-mode with NGC) in 3GPP TS 38.874 v.1.0.0, is depicted in FIG. 3.

The architecture 1a leverages the CU/DU-split architecture. FIG. 3 shows a reference diagram for a two-hop chain of IAB nodes 111a, 111b underneath an IAB donor 110, where IAB node 111 and UE 120 connect in SA-mode to an NGC 140. Underneath shall herein be interpreted as being located downstream the IAB donor 110. In this architecture, each IAB node 111a, 111b comprises a DU and a Mobile Termination (MT) component. Via the MT, the IAB node 111a connects to an upstream IAB node 111b or the IAB donor 110. Via the DU, the IAB node 111b establishes Radio Link Control (RLC)—channels to UEs 120 and to MTs of downstream IAB nodes 111a. For MTs, this RLC-channel may be referred to as a modified RLC*. An IAB node 111a may connect to more than one upstream IAB node 111b or IAB donor DU 110. The IAB node 111 may comprise multiple DUs, but each DU part of the IAB node 111 has a F1-C connection only with one IAB donor 110 CU-Control Plane (CU-CP). The IAB donor 110 may also comprise a DU to support UEs 120 and MTs of downstream IAB nodes. The IAB donor 110 may comprise a CU for the DUs of all IAB nodes 111 and for its own DU. It is assumed that the DUs comprised in an IAB node 111 are served by only one IAB donor 110. This IAB donor 110 may however change through topology adaptation. Each DU on an IAB node 111 connects to the CU in the IAB donor 110 using a modified form of F1, which is referred to as F1*. An F1* User plane interface (F1*-U) runs over RLC channels on the wireless backhaul between the MT of the serving IAB node 111 and the DU of the IAB donor 110. An adaptation layer is added, which holds routing information, enabling hop-by-hop forwarding. The adaption layer may replace an Internet Protocol (IP) functionality of the standard F1-stack. The F1*-U may carry a GPRS Tunneling Protocol-User Plane (GTP-U) header for the end-to-end association between CU and DU. In a further enhancement, information carried inside the GTP-U header may be included into the adaption layer. Furthermore, optimizations to the RLC may be considered, such as e.g. applying Automatic Repeat Request (ARQ) only on an end-to-end connection opposed to hop-by-hop. The right side of FIG. 3 shows two examples of such F1*-U protocol stacks. In FIG. 3, enhancements of the RLC are referred to as RLC*. The MT of each IAB node further sustains Non-Access Stratum (NAS) connectivity to the NG Interface Control Plane (NGC), e.g., for authentication of the IAB node 111. It may further sustain a PDU-session via the NGC, e.g., to provide the IAB node with connectivity to the Operation and Maintenance (OAM) function.

For Non-Standalone (NSA) operation with an Evolved Packet Core (EPC), the MT may be dual-connected with the network using E-UTRAN-NR Dual Connectivity (EN-DC). The IAB node's MT sustains a Packet Data Network (PDN) connection with the EPC, e.g., to provide the IAB node with connectivity to the OAM.

Wireless backhaul links may be vulnerable to blockage, e.g., due to moving objects such as vehicles, due to seasonal changes (foliage), or due to infrastructure changes (new buildings). Such vulnerability also applies to physically stationary IAB nodes. Also, traffic variations can create uneven load distribution on wireless backhaul links leading to local link or node congestion.

Figure 4B:
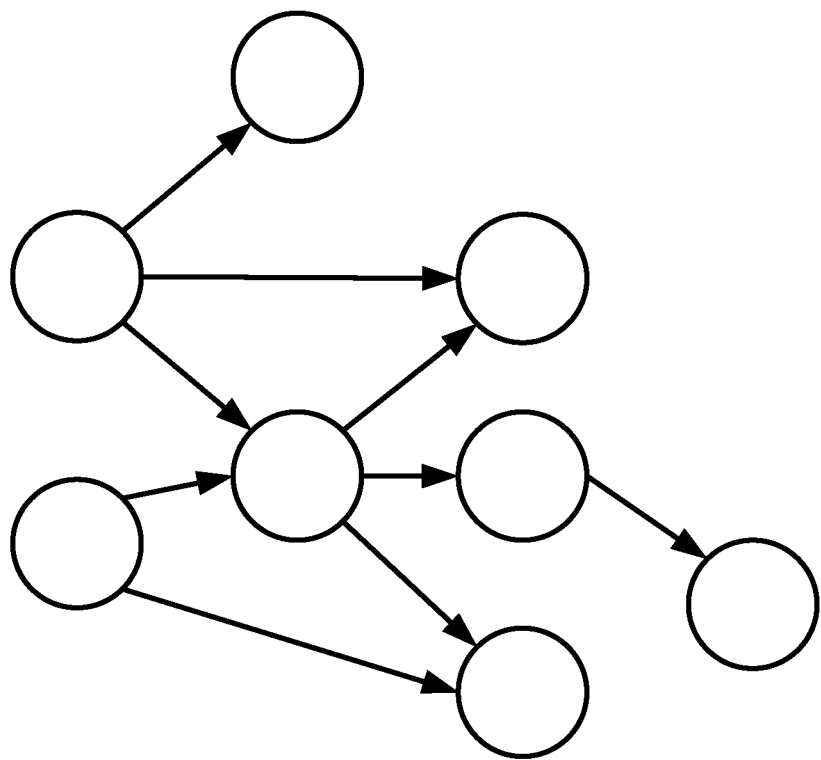
FIG. 4b illustrates a directed acyclic graph (DAG) topology in which network nodes may be organized, FIGS. 5a,b illustrate various link- and route redundancies available for network nodes being organized according to the DAG topology.
Figure 4A:
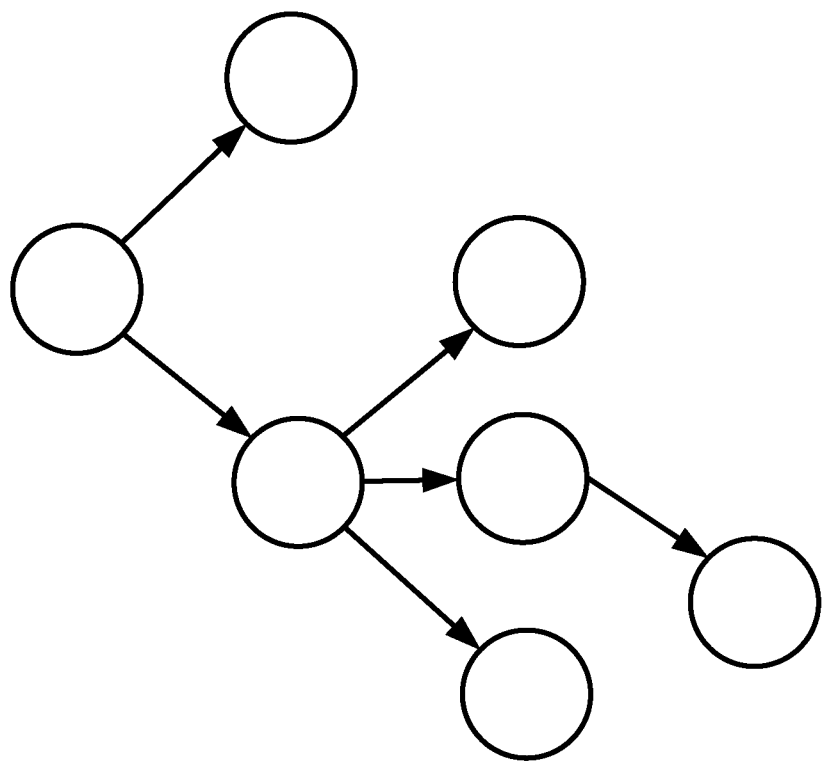
FIG. 4a illustrates a spanning tree topology in which network nodes may be organized.

FIGS. 4a and 4b show examples of the IAB topologies considered in IAB. A first topology is referred to as a Spanning Tree (ST) topology, shown in FIG. 4a, and a second topology is referred to as a Directed Acyclic Graph (DAG), shown in FIG. 4b. The arrow indicates the directionality of the graph edge.

One way to provide robust operation for physically fixed relays is to provide redundant links to two or more parent nodes.

Figure 5B:
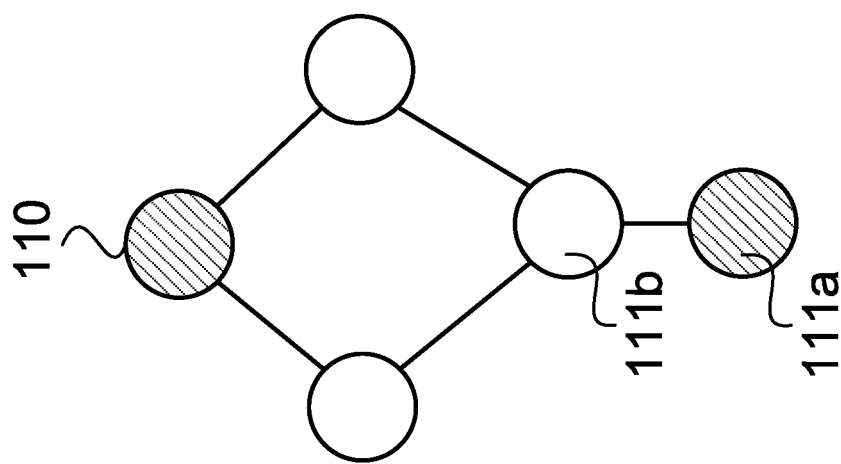
Figure 5A:
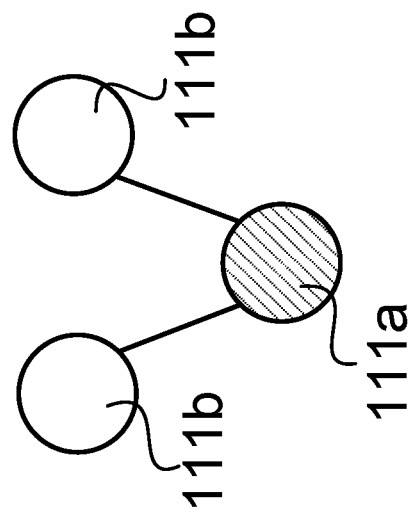

FIGS. 5a and b show examples for link- and route redundancy for the DAG topology. For DAG, the following options can be considered:

The IAB-node 111a may be multi-connected, i.e., it may have links to multiple parent nodes 111b (FIG. 5a).

The IAB-node 111a may have multiple routes to another node, such as e.g. the IAB-donor 110 (FIG. 5b).

Figure 6:
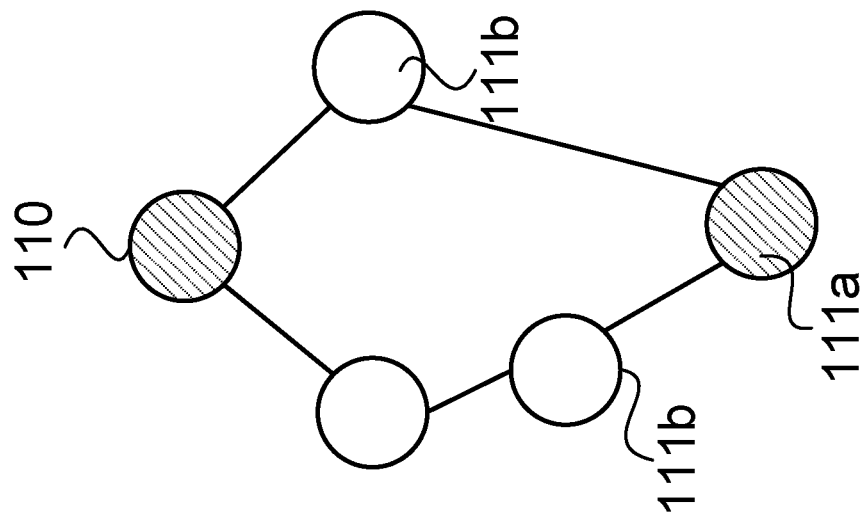
FIG. 6 illustrates a multi-connected IAB node with redundant routes to an IAB donor.

Both options may be combined, i.e., the IAB-node 111a may have redundant routes to another node via multiple parent nodes 111b. This is illustrated in FIG. 6.

Multi-connectivity or route redundancy may be used for back-up purposes. It is also possible that redundant routes are used concurrently, e.g., to achieve load balancing, reliability, etc.

Resource Coordination

From an IAB node MT point-of-view, as in Rel. 15, the following time-domain resources may be indicated for the parent link:

Downlink time resource

Uplink time resource

Flexible time resource

From an IAB node DU point-of-view, the child link may have the following types of time resources:

Downlink time resource

Uplink time resource

Flexible time resource

Not available time resources (resources not to be used for communication on the DU child links)

Each of the downlink, uplink and flexible time-resource types of the DU child link may belong to one of two categories:

Hard: The corresponding time resource is always available for the DU child link

Soft: The availability of the corresponding time resource for the DU child link is explicitly and/or implicitly controlled by the parent node.

An IAB node is configured with IAB node specific resources in time available for the links. Mechanisms for scheduling coordination, resource allocation, and route selection across IAB nodes and/or IAB donors and multiple backhaul hops have been studied, including the following aspects:

Distributed or centralized coordination mechanisms

Resource granularity, adaptation period, and enhancements to existing mechanisms for the required signaling (e.g. slot or symbol-level or TDD configuration pattern) provided to the IAB node Explicit or implicit indication of the resources Exchange of Layer 1 (L1) and/or Layer 3 (L3) measurements between IAB nodes Exchange of topology related information (e.g. hop order) impacting the study of the backhaul link physical layer design Resource (frequency, time in terms of slot/slot format, etc.) coordination which is faster than semi-static coordination and the indication of resources within the configuration which can be dynamically and flexibly used for different links, including The need to consider the scheduling delay, IAB node processing delays, or information required to be available for the use of flexible resources Mechanisms to schedule flexible resources (e.g. Group Common-Physical Downlink Control Channel (GC-PDCCH)).

In order to support mechanisms for resource allocation for IAB nodes, semi-static configuration is supported for the configuration of IAB node DU resources. In addition, dynamic indication (L1 signaling) to an IAB node of the availability of soft resources for an IAB node DU is supported. Existing Rel.15 L1 signaling methods as the baseline, while potential enhancements (e.g. new slot formats), rules for DU/MT behavior in case of conflicts across multiple hops, and processing time constraints at the IAB node may need to be considered.

Table 1 and Table 2 capture the possible combinations of DU and MT behavior. The tables assume an IAB not capable of full-duplex operation. In the tables below the following definitions apply:

"MT: Tx" means that the MT should transmit if scheduled;

"DU: Tx" means that the DU may transmit;

"MT: Rx" means that the MT should be able to receive (if there is anything to receive);

"DU: Rx" means that the DU may schedule uplink transmissions from child nodes or UEs;

"MT: Tx/Rx" means that the MT should transmit if scheduled and should be able to receive, but not simultaneously;

"DU: Tx/Rx" means that the DU may transmit and may schedule uplink transmission from child nodes and UEs, but not simultaneously;

"IA" means that the DU resource is explicitly or implicitly indicated as available;

"INA" means that the DU resource is explicitly or implicitly indicated as not available;

"MT: NULL" means that the MT does not transmit and does not have to be able to receive;

"DU: NULL" means that the DU does not transmit and does not schedule uplink transmission from child nodes and UEs.

Table 1 applies in case of Time Division Multiplexing (TDM) operation, where there can be no simultaneous transmission in the DU and the MT, nor any simultaneous reception in the DU and the MT.

TABLE 1

DU and MT behavior in case of TDM operation

| DU Configuration | MT configuration | | |
|---|---|---|---|
| | Downlink (DL) | Uplink (UL) | F |
| DL-H | DU: Tx<br>MT: NULL | DU: Tx<br>MT: NULL | DU: Tx<br>MT: NULL |
| DL-S | When DU resource:<br>IA<br>DU: Tx<br>MT: NULL<br>When DU resource:<br>INA<br>DU: NULL<br>MT: Rx | When DU resource: IA<br>DU: Tx<br>MT: NULL<br>When DU resource:<br>INA<br>DU: NULL<br>MT: Tx | When DU resource:<br>IA<br>DU: Tx<br>MT: NULL<br>When DU resource:<br>INA<br>DU: NULL<br>MT: Tx/Rx |
| UL-H | DU: Rx<br>MT: NULL | DU: Rx<br>MT: NULL | DU: Rx<br>MT: NULL |
| UL-S | When DU resource:<br>IA<br>DU: Rx<br>MT: NULL<br>When DU resource:<br>INA<br>DU: NULL<br>MT: Rx | When DU resource:<br>IA When<br>DU: Rx<br>MT: NULL<br>When DU resource:<br>INA<br>DU: NULL<br>MT: Tx<br>MT: Tx/Rx | DU resource:<br>IA<br>DU: Rx<br>MT: NULL<br>When DU resource:<br>INA<br>DU: NULL | 
| F-H | DU: Tx/Rx<br>MT: NULL | DU: Tx/Rx<br>MT: NULL | DU: Tx/Rx<br>MT: NULL |
| F-S | When DU resource:<br>IA<br>DU: Tx/Rx<br>MT: NULL<br>When DU resource:<br>INA<br>DU: NULL<br>MT: Rx | When DU resource:<br>IA When DU resource:<br>DU: Tx/Rx<br>MT: NULL<br>When DU resource:<br>INA<br>DU: NULL<br>MT: Tx | IA<br>DU: Tx/Rx<br>MT: NULL<br>When DU resource:<br>INA<br>DU: NULL<br>MT: Tx/Rx |
| NA | DU: NULL<br>MT: Rx | DU: NULL<br>MT: Tx | DU: NULL<br>MT: Tx/Rx |

Table 2 applies in case of Spatial Division Multiplexing (SDM) operation, where there can be simultaneous transmission in the DU and the MT, alternatively simultaneous reception in the DU and the MT.

TABLE 2

DU and MT behavior in case of SDM operation

| | DL | UL | F |
|---|---|---|---|
| DL-H | DU: Tx<br>MT: NULL | DU: Tx<br>MT: Tx | DU: Tx<br>MT: Tx |
| DL-S | When DU resource:<br>IA<br>DU: Tx<br>MT: NULL<br><br>When DU resource:<br>INA<br>DU: NULL<br>MT: Rx | When DU resource:<br>IA<br>DU: Tx<br>MT: Tx<br><br>When DU resource:<br>INA<br>DU: NULL<br>MT: Tx | When DU resource:<br>IA<br>DU: Tx<br>MT: Tx<br>When DU resource:<br>INA<br>DU: NULL<br>MT: Tx/Rx |
| UL-H | DU: Rx<br>MT: Rx | DU: Tx<br>MT: NULL | DU: Rx<br>MT: Rx |
| UL-S | When DU resource:<br>IA<br>DU: Rx<br>MT: Rx<br><br>When DU resource:<br>INA<br>DU: NULL<br>MT: Rx | When DU resource:<br>IA<br>DU: Rx<br>MT: NULL<br><br><br><br>When DU resource:<br>INA<br>DU: NULL<br>MT: Tx | When DU resource:<br>IA<br>DU: Rx (only if MT is<br>Rx and the DU<br>knows<br>that ahead of time)<br>MT: Rx<br><br>When DU resource:<br>INA<br>DU: NULL<br>MT: Tx/Rx |
| F-H | DU: Tx/Rx<br>MT: Tx (only if DU is<br>Rx and the parent DU<br>is aware in advance) | DU: Tx/Rx<br>MT: Rx<br>(only if DU is Tx<br>and the parent is<br>aware in advance) | DU: Tx/Rx<br>MT: Tx (only if DU is<br>Tx and the parent<br>DU<br>knows that ahead of<br>time), Rx (only if<br>DU is<br>Rx and the parent<br>DU<br>is aware in advance) |
| F-S | When DU resource:<br>IA<br>DU: Tx/Rx<br>MT: Rx (only if DU is<br>Rx and the parent DU<br>is aware in advance)<br><br><br>When DU resource:<br>INA<br>DU: NULL<br>MT: Rx | When DU resource:<br>IA<br>DU: Tx/Rx<br>MT: Tx<br>(only if DU is Tx<br>and the parent DU is<br>aware in advance)<br>When DU resource:<br>INA<br>DU: NULL<br>MT: Tx | When DU resource:<br>IA<br>DU: Tx/Rx<br>MT: Tx (only if DU is<br>Tx and the parent<br>DU<br>knows that ahead of<br>time), Rx (only if<br>DU is<br>Rx and the parent<br>DU<br>is aware in advance)<br>When DU resource:<br>INA<br>DU: NULL<br>MT: Tx/Rx |
| NA | DU: NULL<br>MT: Rx | DU: NULL<br>MT: Tx | DU: NULL<br>MT: Tx/Rx |

In the semi-static resource allocation, a DU configuration with 7 resource types (DL-hard/UL-hard/Flexible-hard/DL-soft/UL-soft/Flexible-soft/Not-Available) is issued from the donor CU to the respective IAB DU. If one of the IAB DU is configured with hard resource, by definition, the IAB DU can use the resource regardless of the status of the MT part of the same IAB node. Due to the ignorance of IAB DU's configuration, the parent node of this IAB node may still for scheduling UL or DL transmission towards the IAB MT during the time resource that coincides with the IAB DU's hard resource. Thus, some of the scheduled grants may be wasted because the IAB MT is not available. If the IAB DU is configured with soft resource, the IAB DU cannot use the resource unless it is explicitly or implicitly indicated by the parent node as available. Particularly regarding the explicit indication, the parent node will not release any resource unless it knows, by some means, that the IAB DU is configured with soft resource and would request the usage of that resource.

The embodiments herein provide a solution for improving the utilization of spectrum resources in an IAB network. The embodiments herein disclose a novel signaling mechanism for providing resource (re)configuration information of IAB nodes to the DU part of their parent IAB nodes that will enable efficient utilization of spectrum resources in an IAB network.

The embodiments herein provide approaches to inform the IAB nodes about the resource configuration of their child IAB nodes. Thereby, the parent IAB nodes may control the resource utilization of the links to their different child nodes, ensuring that DL transmissions and/or UL grants will not be provided during those time-domain resources where the child nodes are not able to utilize them.

Figure 7:
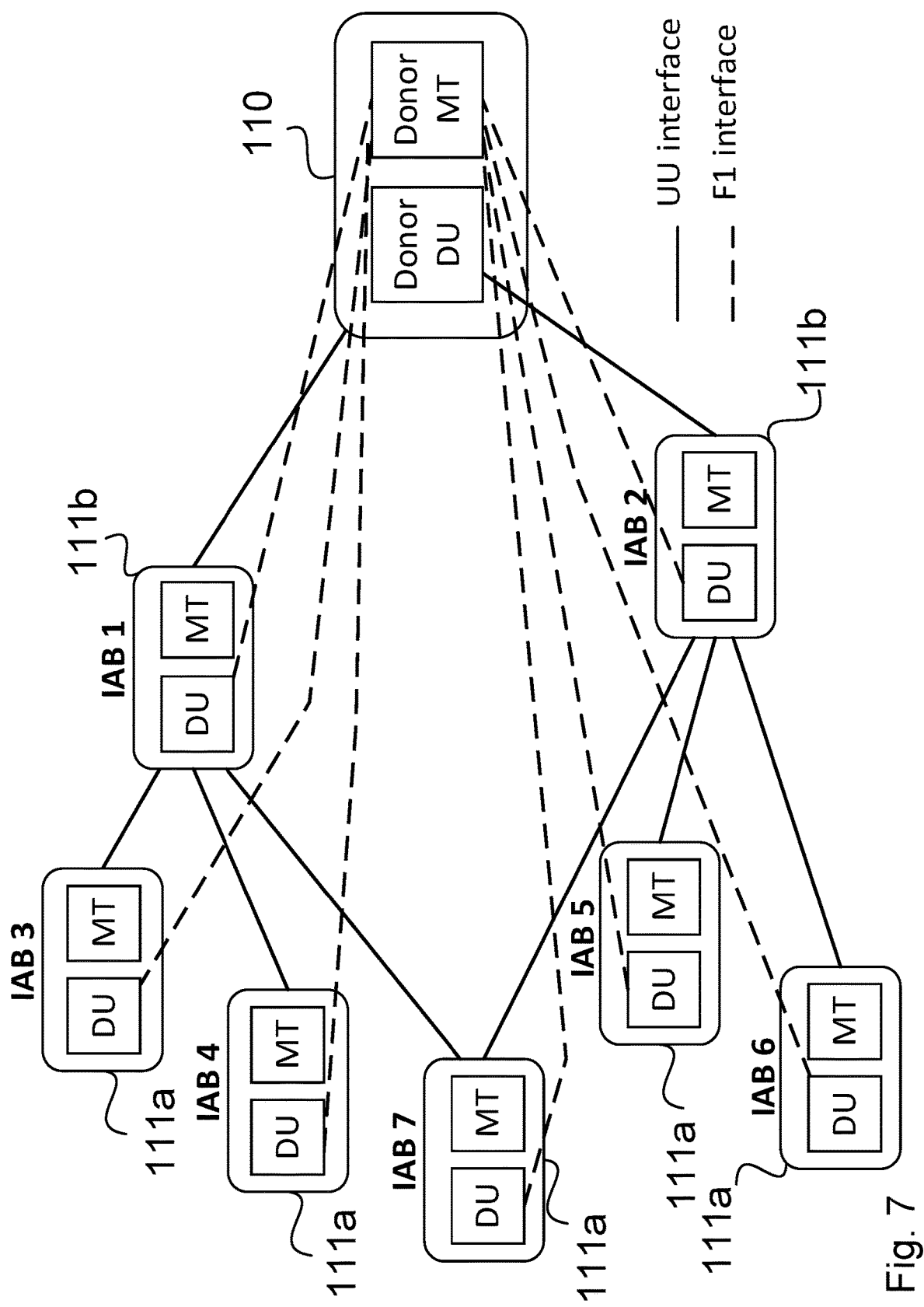
FIG. 7 illustrates a network topology in which the embodiments herein may be implemented.

In the following, the embodiments herein will be described in further detail. The embodiments herein are in the following described for the topology shown in FIG. 7 shown below. According to the topology shown in FIG. 7 the IAB donor 110 has two child nodes herein referred to as IAB 1 and IAB 2. IAB 1 has three child nodes: IAB 3, IAB 4 and IAB 7. IAB 2 also has three child nodes: IAB 5, IAB 6, and IAB 7. Particularly, IAB 7 has two parent nodes: IAB 1 and IAB 2.

Whenever the donor node 110 CU configures or reconfigures the resource pattern to be used by an IAB node, it may inform all the parent nodes of the IAB node. There are several ways of realizing this.

In one embodiment, the CU may send independent F1-AP messages that contain the resource configurations for each concerned IAB node. For the situation depicted in FIG. 7, if the CU (re)configures the resource pattern of the radio network node IAB 7, it will have to send 3 F1-AP messages, such as an F1 resource indication message to the node 111a whose resource pattern is being changed, which in this case is IAB 7, an F1 resource indication message to the first parent radio network node 111b (IAB1) and an F1 resource indication message to the second parent radio network node 111b (IAB2). The F1 resource indication message may be an enhancement of an existing F1 interface management message, such as e.g. a gNB-DU Configuration Update or a gNB-DU Resource Coordination, or a new message, such as e.g. an IAB Resource Update. In order to distinguish the case whether the message is concerning the receiver IAB node or a child node, an optional information element (IE), which may e.g. be referred to as child, may be included. The absence of the IE may indicate that the resource information is concerning the IAB node that receives the message, while the presence of this IE may indicate that the resource pattern is concerning a child of the IAB node that is indicated by the IE. For example, for the case example where the IAB 7 resource is being modified, the F1-AP message to IAB 7 may not contain the child field, while the F1-AP message to the parent nodes IAB 1 and IAB 2 may include this field. The field may be set to an identity that identifies the child IAB node. A possible candidate for that may be an F1 AP UE context ID (gNB-DU UE F1AP ID or gNB-CU UE F1AP ID) that is associated with the MT part of the IAB 7 and which has been assigned to IAB 7 when the MT part of IAB 7 gets connected to the parent nodes 111b, in this case IAB 1 and IAB 2. It shall be noted that the F1-AP ID's in the two parents may be the same or different as they are assigned independently may be used to uniquely identify IAB 7's MT context in the CU-IAB1 and CU-IAB2 F1 interfaces.

In a second embodiment, the donor node 110 CU may send an F1 UE context management message, such as e.g. a UE CONTEXT MODIFICATION REQUEST, to a parent IAB node that comprises an embedded RRC message. The resource pattern configuration may be comprised in the RRC message and it may optionally be included directly in the F1-AP message as well (similar to the case of the first embodiment). The parent node 111b may store the resource pattern of the child node 111a internally, such as e.g. in a mapping table of children identities and their resource configurations, and may forward the RRC message to the destination child node 111a, which in this case is IAB 7. Another possibility may be to not include the resource configuration directly inside the F1-AP message in a separate IE, but let the parent node read it by looking into the embedded RRC message. This approach, though signaling wise efficient, requires the IAB node to be able to understand future versions of RRC (e.g. it may not allow a setup where a node is running the 3GPP rel-16 of the F1 specifications while the MT is running a 3GPP rel-17 RRC). Once the child IAB node 111a receives the RRC message, it may internally transfer the resource configuration to its DU part, which starts applying the resource configuration. In case the destination IAB node has multiple parent nodes 111b, such as e.g. IAB7 above, the RRC message may be included in the F1-AP message to the first parent, such as e.g. in the F1 UE context modification request message to IAB 1, while it may be left out in subsequent F1-AP messages to other parents such as e.g. to IAB 2.

In order to ensure that the RRC message will not be interpreted as an RRC message to the MT part of the destination IAB node, the parent IAB node may encapsulate the RRC message within an adaptation header that includes header information that is the same as for F1-AP messages destined to the DU part of the child IAB node 111a (e.g. IAB 7 above) and maps to the backhaul RLC channel between the parent 111b (IAB1 above) and child 111a (IAB 7 above) that is associated with the F1-AP messages. When the MT part of the IAB node receives this packet, it will assume that it is an F1-AP to the DU part of the IAB node and may forward the message through an internal interface accordingly. In one variant of the second embodiment, the DU of the destination IAB node (such as e.g. IAB 7 above), may upon receiving the RRC message read the contents, identify the resource pattern and apply it.

In another variant of the second embodiment, the RRC message may indeed be received by the MT. No adaptation header may be added, and the message may be sent directly to the MT via access RLC channels that are associated with signaling radio bearers. The MT may then identify that the message is a resource configuration message for the DU part, e.g. based on a message identifier and/or header comprised in the RRC message, extract the resource configuration fields from the message, and forward the resource configuration to the DU part through an internal interface.

According to a further variant of the second embodiment, instead of an RRC message, the encapsulated message may not be an RRC message but an F1-AP message to the child node. The parent IAB node will forward whatever is in the transparent container that is supposed to contain an RRC message from the MT to the DU through an internal interface.

The embodiments hereon enable better coordination between an IAB node and its parent node(s) and largely reduce possible resource wastage. Some of the benefits achieved with the embodiments herein are:

When the IAB DU is configured with hard resources, by knowing the IAB DU configuration of the child node the parent node(s) can avoid scheduling conflicting transmission to/from the MT part of the child IAB node. This enables the parent node to distribute its configured resources more efficiently towards different child-node MTs and UEs.

When the IAB DU is configured with soft resources, by knowing the IAB DU configuration, the parent node(s) can actively release available resources to the IAB DU considering trade-off between resource-utilization efficiency at the parent node and at the IAB node.

Figure 8:
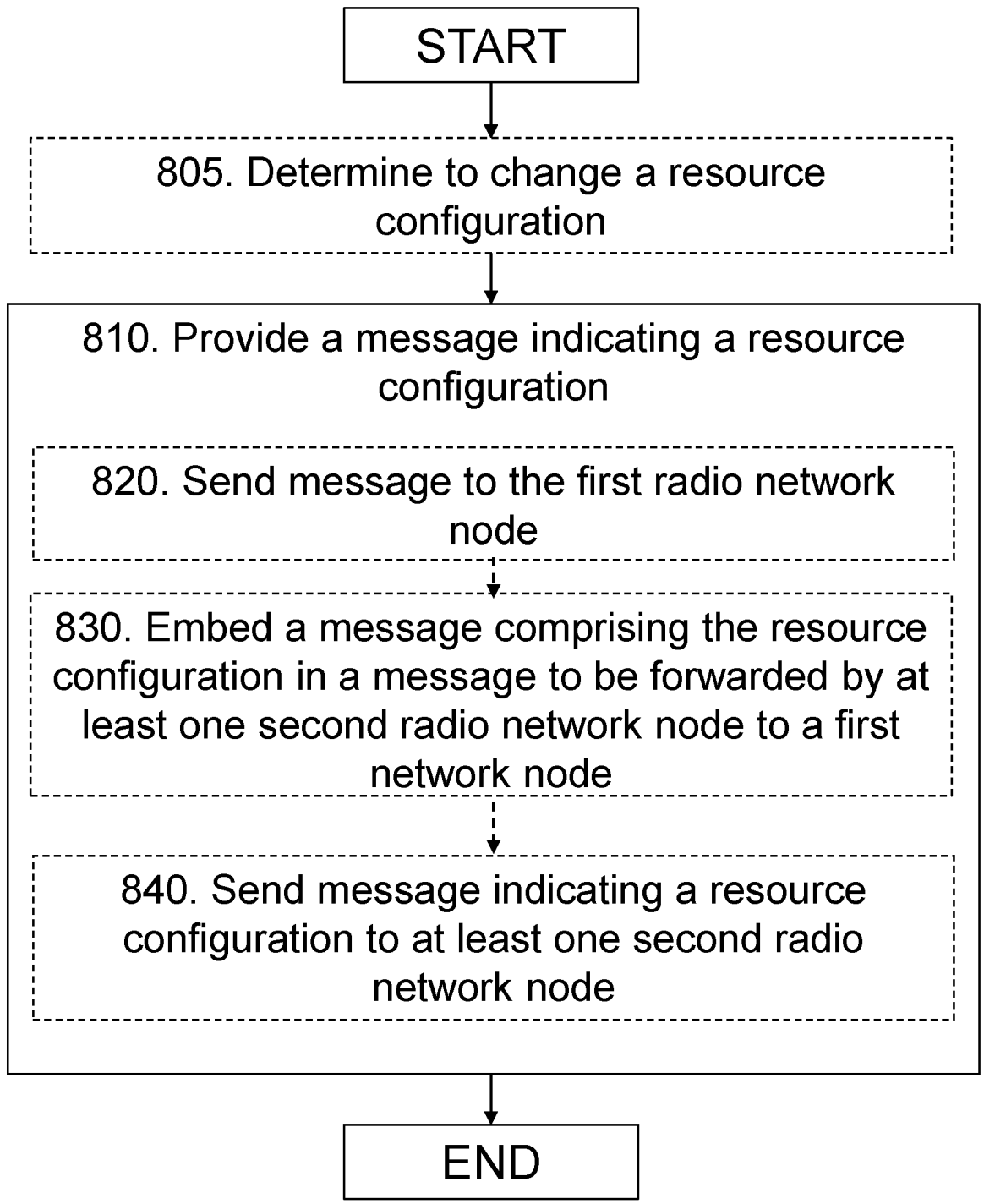
FIG. 8 is a flowchart depicting a method performed by a network node according to embodiments herein.

FIG. 8 illustrates the method actions of method 800. The method 800 is performed by a network node 110, such as e.g. the IAB donor node described above, in the wireless communication system 100, for handling resource configurations for network nodes 111 in an IAB network. The network node 110 is connected to a core network of the wireless communications system 100 and to at least one radio network node 111. The network node 110 may have a wired connection to the core network of the wireless communications system 100 and a wireless connection to the at least one radio network node 111.

Action 805: The network node 110 may determine to change a resource configuration of a first radio network node 111a out of the one or more radio network nodes 111. The resource configuration may e.g. be changed by configuring or reconfiguring the first radio network node 111a.

Action 810: The network node 110 provides, to a first radio network node 111a and to at least one radio network node 111b, a message indicating a resource configuration for the first radio network node 111a. The message may be sent using the wireless connection. The one or more second radio network nodes 111b is/are parent nodes to the first radio network node 111a and the first radio network node 111a is a child node to the one or more second radio network nodes 111b.

The message indicating the resource configuration for the first radio network node 111a may be provided to the first radio network node 111a and to the at least one second radio network node 111b in different ways. In one embodiment, action 810 of providing the message indicating the resource configuration for the first radio network node 111a comprises action 820 and action 840.

Action 820: The network node 110 may provide the message comprising the resource configuration by sending a resource indication message comprising the resource configuration for the first radio network node 111a to the first radio network node 111a.

Action 840: The network node 110 may further send a resource indication message comprising the resource configuration for the first radio network node 111a to the at least one second radio network nodes 111b.

Thus, in this embodiment, the network node 110 may provide the message comprising the resource configuration by sending a separate resource indication message comprising the changed resource configuration for the first radio network node 111a to each of the first radio network node 111a and the one or more second radio network nodes 111b of the first radio network node 111a.

The resource indication message sent to the second radio network nodes 111b may comprise an information element indicating that the resource configuration concerns the first radio network node 111a being a child of the one or more second radio network nodes 111b. This may be done to indicate to the one or more second radio network nodes 111*b* that the resource configuration is related to one of their child nodes and the specific child node which the resource configuration relates to.

The resource indication message may be an application protocol message sent over an F1 interface.

According to this embodiment the network node 110 sends the resource configuration directly to the first radio network node and also informs the second radio network nodes, i.e. the parent nodes of the first radio network node 111*a*, about the new resource configuration of their child node.

In another embodiment, action 810 of providing the message indicating the resource configuration for the first radio network node (111*a*), comprises action 830 and action 840.

Action 830: The network node 110 may provide the message indicating the resource configuration by embedding a message comprising the resource configuration for the first radio network node 111*a* in at least one of the message which is to be sent to the at least one second radio network node 111*b*. The embedded message is to be forwarded to the first radio network node 111*a* by the at least one second radio network node 111*b*. Accordingly, at least one of the resource indication message sent to the at least one second radio network node 111*b* in action 840 may comprise the embedded message to be forwarded to the first radio network node 111*a*.

Thus, in this embodiment, the network node 110 may provide the message comprising the resource configuration by sending a, i.e. first, message comprising an embedded second message to be forwarded to the first radio network node 111*a*, to each of the one or more second radio network nodes 111*b*, i.e. to the parent nodes of the first radio network node 111*a*. The embedded second message may comprise the changed resource configuration for the first radio network node 111*a*. The message may e.g. be sent by means of a CU of the network node 110.

The first radio network node 111*a* may correspond to the node whose resource pattern is being changed, such as e.g. IAB7 as described in relation to FIG. 7 described above. Hence, all of the embodiments described for the IAB7 herein also apply to the first radio network node 111*a*.

In some embodiments herein, both the first message and the embedded second message may comprise the resource configuration of the first radio network node 111*a*.

The first message comprising the embedded message may e.g. be an application protocol message sent over an F1 interface, which may also be referred to as an F1-AP message, and the embedded second message may be an RRC message. The embedded second message may e.g. be embedded in the first message in a transparent container, which comprises information that shall be transferred transparently through the one or more second radio network nodes 111*b* to the first radio network node 111*a*.

The network node 110 may correspond to the IAB donor as described in relation to FIG. 7 above. Hence, all of the embodiments described for the IAB donor node herein also apply to the network node 110.

Figure 9:
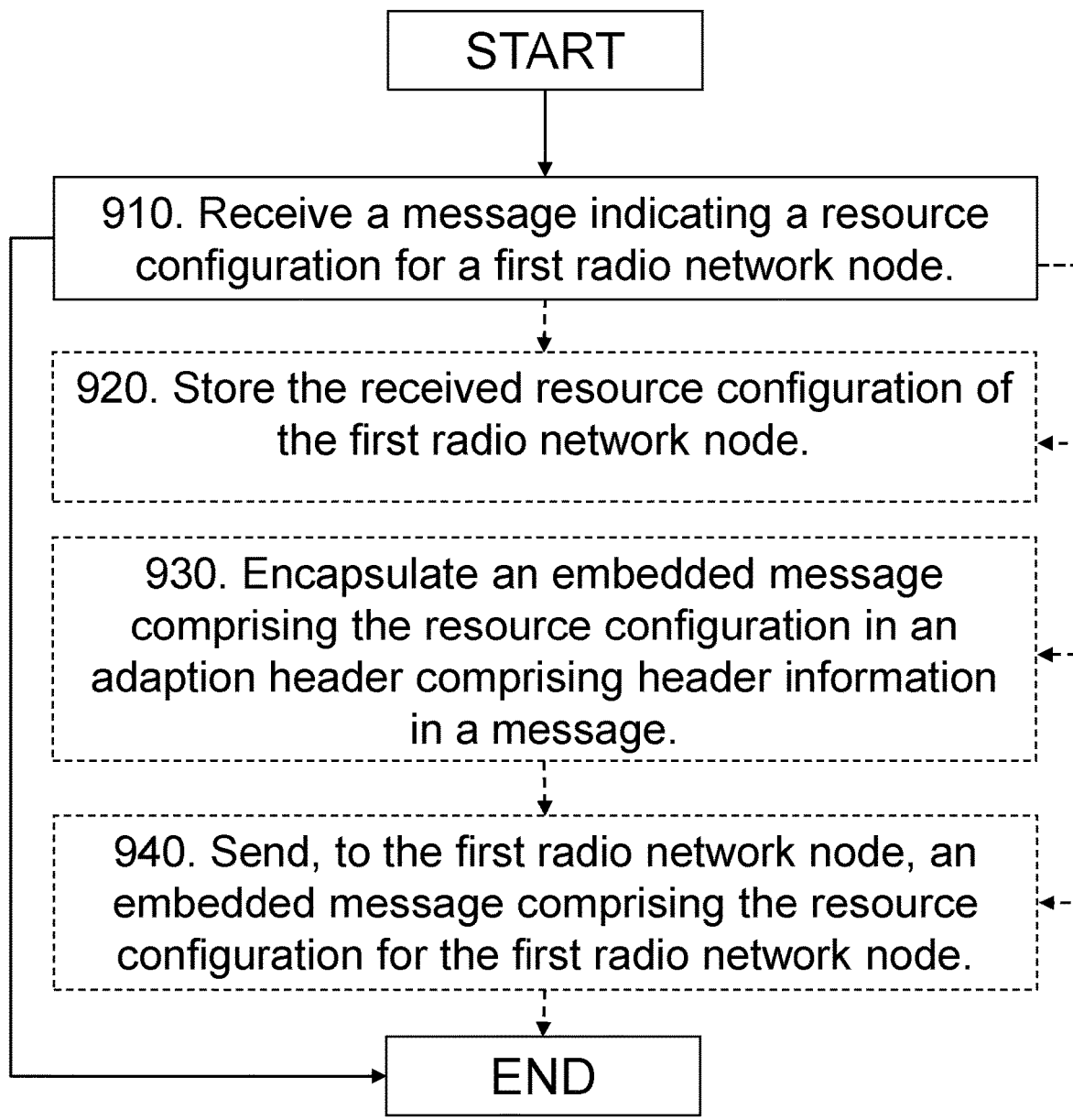
FIG. 9 is a flowchart depicting a method performed by a second radio network node according to embodiments herein.

FIG. 9 illustrates the method actions of method 900 performed by a second radio network node 111*b* in the wireless communication system 100, for handling resource configurations for network nodes in the IAB network. The second radio network node 110 is connected to at least one radio network node 111 and to a network node 110 connected to a core network of the wireless communications system 100. The second radio network node 110 may have a wireless connection to the at least one radio network node 111 and to a network node 110 having a wired connection to the core network of the wireless communications system 100.

Action 910: The second radio network node 111*b* receives, from the network node 110, a message indicating a resource configuration for a first radio network node 111*a* of the at least one radio network node 111. The message may indicate a changed resource configuration for the first radio network node 111*a*. The received message may be referred to as a first message. The first radio network node 111*a* is a child node of the second radio network node 111*b*.

The received first message may be a resource indication message comprising an information element indicating that the resource configuration concerns the first radio network node 111*a*. The first radio network node 111*a* is a child node of the one or more second radio network nodes 111*b*.

The received message may comprise an embedded message to be forwarded to the first radio network node 111*a*. The embedded message may be referred to as a second message. The embedded, or second, message comprises the resource configuration for the first radio network node 111*a*, which may be a changed resource configuration.

In some embodiments herein both the received first message and the embedded second message may comprise the changed resource configuration of the first radio network node 111*a*.

The received first message may be an application protocol message received over an F1 interface and the embedded second message may be the RRC message. The second message may e.g. be embedded in the first message in the transparent container.

The second radio network node 111*b* may e.g. receive the first message from the network node 110 by means of a DU of the second radio network node 111*b*.

Action 920: The second radio network node 111*b* may store the received resource configuration of the first radio network node 111*a*.

Action 940: When the message received in action 910 comprises an embedded second message to be forwarded to the first radio network node 111*a*, the second radio network node 111*b* may further send, which may also be referred to as forwards, to the first radio network node 111*a*, the embedded second message comprising the resource configuration for the first radio network node 111*a*. The embedded message may comprise a changed resource configuration for the first radio network node 111*a*.

Prior to sending the embedded second message to the first radio network node 111*a*, the second radio network node 111*b* may further encapsulate the second message in the adaption header comprising header information according to the F1 interface, action 930.

The second radio network node 111*b* may e.g. send the embedded second message to the first radio network node 111*a* by means of a DU of the second radio network node 111*b*.

The second radio network node 111*b* described herein may correspond to the parent IAB node as described in relation to FIG. 7 above. Hence, all of the embodiments described for the parent IAB node, such as e.g. for the IAB 1 and IAB 2, herein also apply to the second radio network node 111*b*.

Figure 10:
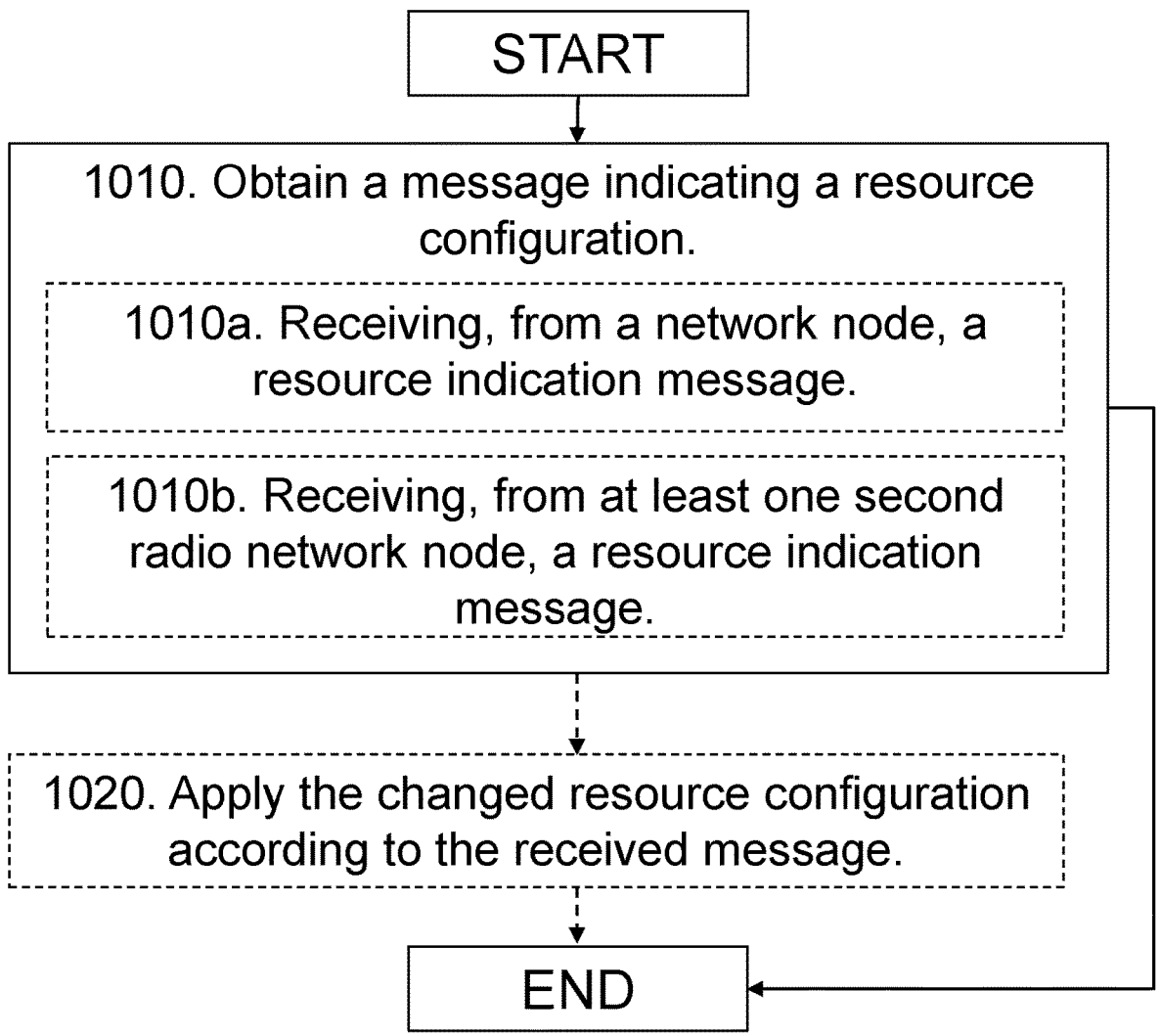
FIG. 10 is a flowchart depicting a method performed by a first radio network node according to embodiments herein.

FIG. 10 illustrates some exemplary method actions of method 1000 performed by a first radio network node 111*a* in a wireless communication system 100, for handling resource configurations for network nodes in the IAB network. The first radio network node 111*a* is connected to at least one second radio network node 111*b*. The first radio network node 111*a* may further be connected to a core network of the wireless communication system 100. The first radio network node 111*a* may have a wireless connection to the one or more second radio network nodes 111*b* and/or the network node 110 having a wired connection to a core network of the wireless communications system.

Action 1010: The first radio network node 111*b* may obtain a message indicating a resource configuration for the first radio network node 111*a*. The message may indicate a changed resource configuration for the first radio network node 111*a*.

The changed resource configuration for the first radio network node 111*a* may e.g. be a resource configuration for the DU of the first radio network node 111*a*.

Action 1010*a*: The first radio network node 111*a* may obtain the message by receiving, from the network node 110, a resource indication message comprising the changed resource configuration for the first radio network node 111*a*.

The resource indication message may e.g. be the application protocol message received over the F1 interface, such as the F1-AP message, from the network node 110.

The first radio network node 111*a* may e.g. receive the resource indication message from the network node 110 by means of the DU of the first radio network node 111*a*.

Action 1010*b*: The first radio network node 111*a* may obtain the message by receiving, from one or more second radio network nodes 111*b*, a resource indication message comprising the changed resource configuration for the first radio network node 111*a*.

The resource indication message may be an RRC message received from the one or more second radio network nodes 111*b*.

The RRC message received from the one or more second radio network nodes 111*b* may be encapsulated in an adaption header comprising header information according to the F1 interface. Thereby the first radio network node 111*a* will handle the RRC message as an application protocol message received over the F1 interface.

The resource configuration message may be received from the one or more second radio network nodes 111*b* by means of an MT unit of the first network node 111*a*.

Action 1020: The first radio network node 111*a* may apply the resource configuration according to the received message. The resource configuration may be a changed resource configuration.

The first radio network node 111*a* may correspond to the node whose resource pattern is being changed, such as e.g. IAB7 as described in relation to FIG. 7 described above. Hence, all of the embodiments described for the IAB7 herein also apply to the first radio network node 111*a*.

Figure 11:
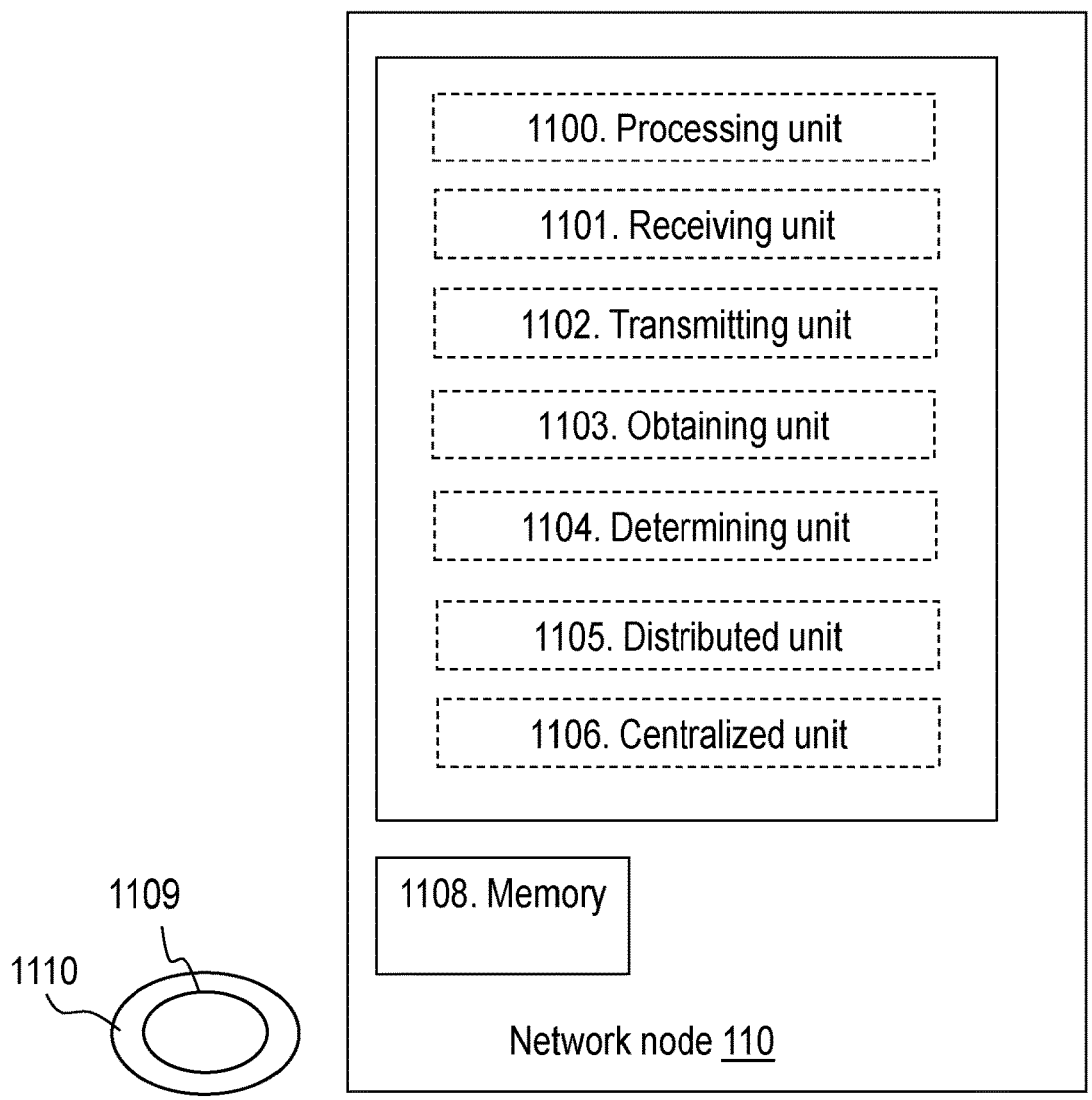
FIG. 11 is a schematic block diagram illustrating some first embodiments of a network node.

FIG. 11 is a block diagram depicting the network node 110, in the wireless communication system 100, such as e.g. a 5G system, for handling resource configurations for network nodes in an integrated access and backhaul, IAB, network, wherein the network node 110 may have a wired connection to a core network of the wireless communications system and a wireless connection to one or more radio network nodes 111. The network node 110 may be an eNB in an E-UTRA system or a gNB in a NR system which may act as a donor node in the IAB network.

The network node 110 may comprise a processing unit 1100, such as e.g. one or more processors, a receiving unit 1101, a transmitting unit 1102, an obtaining unit 1103, a determining unit 1104, a distributed unit 1105 and/or a centralized unit 1106 as exemplifying hardware units configured to perform the method as described herein for the network node 110.

The network node 110 may be configured to, e.g. by means of the processing unit 1100 and/or the determining unit 1104 being configured to, determine to change a resource configuration of a first radio network node 111*a* out of the one or more radio network nodes 111. The resource configuration may e.g. be changed by configuring or reconfiguring the first radio network node 111*a*.

The network node 110 may be configured to, e.g. by means of the processing unit 1100 and/or the transmitting unit 1102 and/or the centralized unit 1106 being configured to, provide, to the first radio network node 111*a* out of the one or more radio network nodes 111 and to one or more second radio network nodes 111*b* of the first radio network node 111*a*, a message indicating the changed resource configuration for the first radio network node 111*a*. The network node 110 may be configured to, e.g. by means of the processing unit 1100 and/or the transmitting unit 1102 being configured to, provide the message using the wireless connection.

In one example embodiment, the network node 110 may be configured to, e.g. by means of the processing unit 1100 and/or the transmitting unit 1102 and/or the centralized unit 1106 being configured to, send, a resource indication message comprising the resource configuration for the first radio network node 111*a* to the first radio network node 111*a*. The network node 110 may further be configured to, e.g. by means of the processing unit 1100 and/or the transmitting unit 1102 and/or the centralized unit 1106 being configured to, send, a resource indication message comprising the resource configuration for the first radio network node 111*a* to the at least one second radio network node 111*b* of the first radio network node 111*a*. Thus, the network node 110 may be configured to, e.g. by means of the processing unit 1100 and/or the transmitting unit 1102 and/or the centralized unit 1106 being configured to send, to each of the first radio network node 111*a* and the one or more second radio network nodes 111*b* of the first radio network node 111*a*, a separate resource indication message comprising the changed resource configuration for the first radio network node 111*a*.

The network node 110 may be configured to, e.g. by means of the processing unit 1100 and/or the sending unit 1102 and/or the centralized unit 1106 being configured to, send the resource indication message to the second radio network nodes 111*b* comprising an information element indicating that the resource configuration concerns the first radio network node 111*a* being a child of the one or more second radio network nodes 111*b*.

The network node 110 may be configured to, e.g. by means of the processing unit 1100 and/or the sending unit 1102 and/or the centralized unit 1106 being configured to, send the resource indication message as an application protocol message over an F1 interface, such as e.g. as a F1-AP message.

According to another example embodiment, the network node 110 may be configured to, e.g. by means of the processing unit 1100 and/or the sending unit 1102 and/or the centralized unit 1106 being configured to, send, to each of the one or more second radio network nodes 111*b*, a first message comprising an embedded second message to be forwarded to the first radio network node 111*a*, wherein the embedded second message comprises the changed resource configuration for the first radio network node 111*a*.

The network node 110 may be configured to, e.g. by means of the processing unit 1100 and/or the sending unit 1102 and/or the centralized unit 1106 being configured to, send the changed resource configuration of the first radio network node 111a comprised in both the first message and the embedded second message.

The network node 110 may be configured to, e.g. by means of the processing unit 1100 and/or the sending unit 1102 and/or the centralized unit 1106 being configured to, send the first message as an application protocol message over an F1 interface and the embedded second message as an RRC message.

The network node 110 may be configured to, e.g. by means of the processing unit 1100 and/or the sending unit 1102 and/or the centralized unit 1106 being configured to, embed the second message in the first message in a transparent container.

The network node 110 may further comprise a CU being configured to perform the method actions according to FIG. 7 and the embodiments herein relating to the network node 110.

Figure 12:
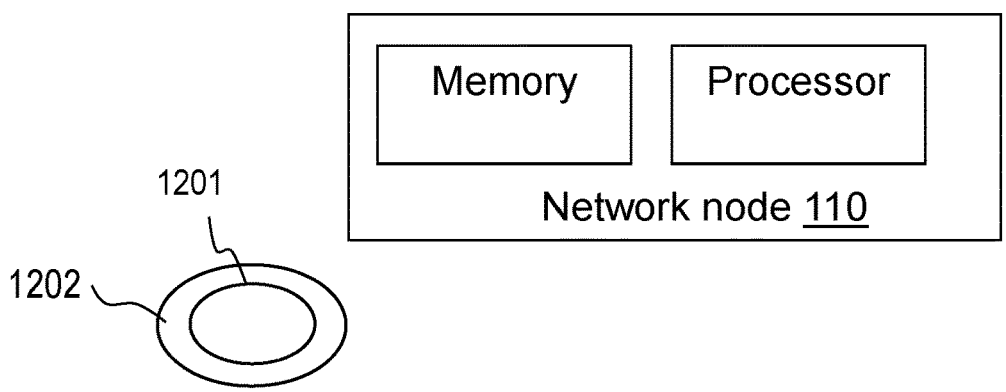
FIG. 12 is a schematic block diagram illustrating some second embodiments of the network node.

The embodiments herein may be implemented through a respective processor or one or more processors of a processing circuitry in the network node 110 as depicted in FIG. 12, which processing circuitry is configured to perform the method actions according to FIG. 8 and the embodiments described above for the network node 110 and the IAB donor node.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as e.g. a memory stick. The computer program code may furthermore be provided as pure program code on a server and downloaded to the network node 110.

The transmitting device may further comprise a memory 1108. The memory may comprise one or more memory units to be used to store data on, such as e.g. resource allocations, software, patches, system information (SI), configurations, diagnostic data, performance data and/or applications to perform the methods disclosed herein when being executed, and similar.

The method according to the embodiments described herein for the network node 110 may be implemented by means of e.g. a computer program product 1109, 1201 or a computer program, comprising instructions, i.e., software code portions, which, when executed on at least one processor, cause at least one processor to carry out the actions described herein, as performed by the network node 110. The computer program product 1109, 1201 may be stored on a computer-readable storage medium 1110, 1202, e.g. a disc or similar. The computer-readable storage medium 1110, 1202, having stored thereon the computer program, may comprise instructions which, when executed on at least one processor, cause the at least one processor to carry out the actions described herein, as performed by the network node 110. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the network node 110.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

Figure 13:
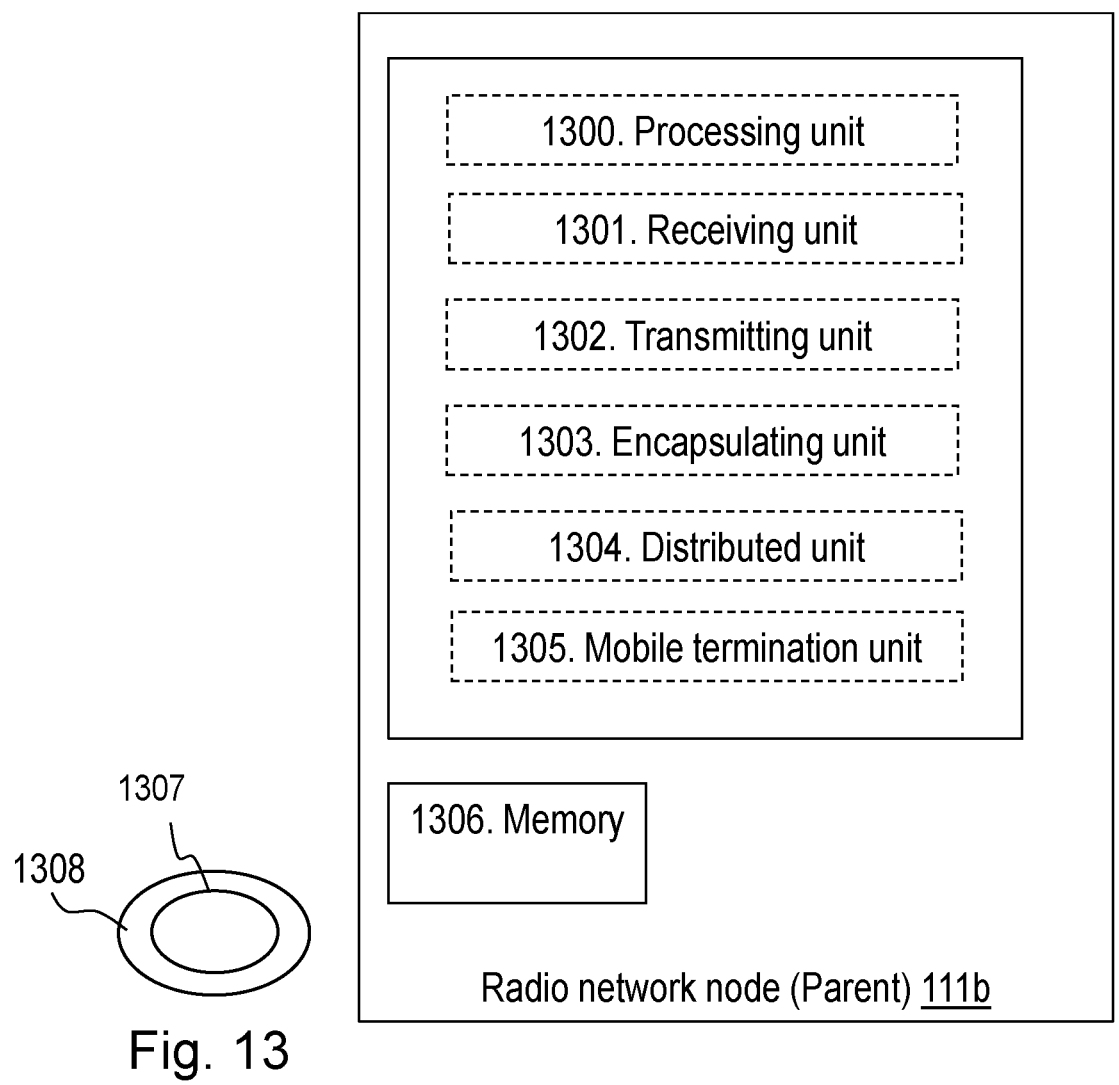
FIG. 13 is a schematic block diagram illustrating some first embodiments of a second radio network node.

FIG. 13 is a block diagram depicting the second radio network node 111b in the wireless communication system 100, for handling resource configurations for network nodes in the IAB network. The second radio network node 111b may have a wireless connection to one or more radio network nodes 111 and a network node 110 having a wired connection to a core network of the wireless communications system The second radio network node 111b may comprise a processing unit 1300, such as e.g. one or more processors, a receiving unit 1301, a transmitting unit 1302, an encapsulating unit 1303, a distributed unit 1304, a mobile termination unit 1305 and/or a memory unit 1306 as exemplifying hardware units configured to perform the method as described herein for the second radio network node 111b.

The second radio network node 111b may be configured to, e.g. by means of the processing unit 1300 and/or the receiving unit 1301 and/or the distributed unit 1304 being configured to, receive, from the network node 110, a message indicating a changed resource configuration for a first radio network node 111a, the first radio network node being a child node of the second radio network node 111a. The received message may be referred to as a first message.

The second radio network node 111b may be configured to, e.g. by means of the memory unit being configured to, store the received resource configuration of the first radio network node 111a.

The second radio network node 111b may be configured to, e.g. by means of the processing unit 1300 and/or the receiving unit 1301 and/or the distributed unit 1304 and/or the distributed unit 1304 being configured to, receive the first message as a resource indication message comprising an information element indicating that the resource configuration concerns the first radio network node 111a being a child of the one or more second radio network nodes 111b.

The received message may comprise an embedded message to be forwarded to the first radio network node 111a. The embedded message may be referred to as a second message. The embedded message may comprise the resource configuration for the first radio network node 111a. The second radio network node 111b may be configured to, e.g. by means of the processing unit 1300 and/or the transmitting unit 1302 and/or the distributed unit 1304 being configured to, send, to the first radio network node 111*a*, the embedded second message comprising the changed resource configuration for the first radio network node 111*a*, when the received message comprises an embedded second message to be forwarded to the first radio network node 111*a*.

The second radio network node 111*b* may be configured to, e.g. by means of the processing unit 1300 and/or the transmitting unit 1302 and/or the distributed unit 1304 being configured to, send the changed resource configuration of the first radio network node 111*a*, which may be comprised in both the first message and the embedded second message.

The second radio network node 111*b* may be configured to, e.g. by means of the processing unit 1300 and/or the receiving unit 1301 and/or the distributed unit 1304 being configured to, receive the first message as the application protocol message over the F1 interface and the embedded second message as an RRC message.

The second radio network node 111*b* may be configured to, e.g. by means of the processing unit 1300 and/or the receiving unit 1301 and/or the distributed unit 1304 being configured to, receive the second message embedded in the first message in a transparent container.

The second radio network node 111*b* may be configured to, e.g. by means of the processing unit 1300 and/or the transmitting unit 1302 and/or the encapsulating unit 1303 and/or the distributed unit 1304 being configured to, encapsulate the second message in an adaption header comprising header information according to the F1 interface prior to sending the embedded second message to the first radio network node 111*a*.

The second radio network node 111*b* may be configured to, e.g. by means of the processing unit 1300 and/or the transmitting unit 1302 and/or the distributed unit 1304 being configured to, send the embedded second message to the first radio network node 111*a* by means of the DU of the second radio network node 111*b*.

Figure 14:
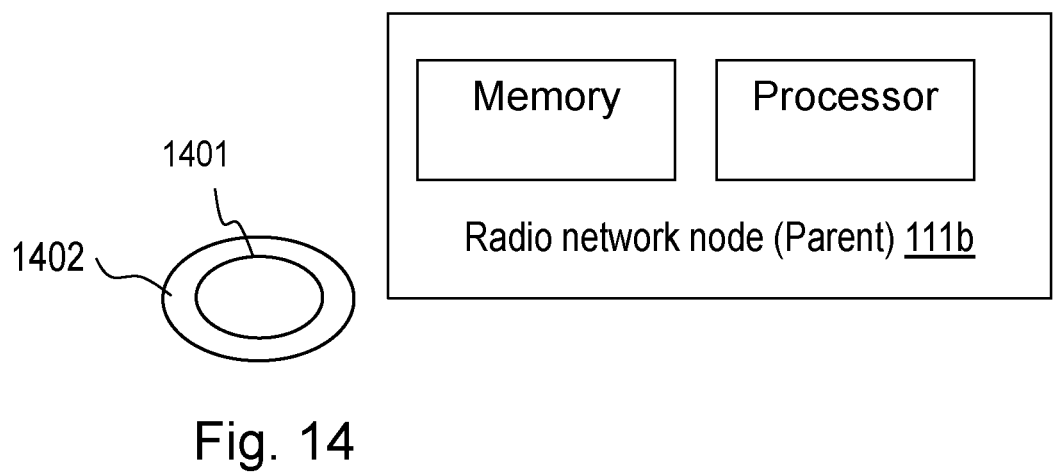
FIG. 14 is a schematic block diagram illustrating some second embodiments of the second radio network node.

The embodiments herein may be implemented through a respective processor or one or more processors of a processing circuitry in the second radio network node 111*b* as depicted in FIG. 14, which processing circuitry is configured to perform the method actions according to FIG. 9 and the embodiments described above for the second radio network node 111*b* and/or the parent IAB node described herein.

The embodiments may be performed by the processor together with respective computer program code for performing the functions and actions of the embodiments herein described for the second radio network node 111*b*. The program code mentioned above may also be provided as a computer program product, for instance in the form of a data carrier carrying computer program code for performing the embodiments herein when being loaded into the second radio network node 111*b*. One such carrier may be in the form of a CD ROM disc. It is however feasible with other data carriers such as e.g. a memory stick. The computer program code may furthermore be provided as pure program code on a server and downloaded to the second radio network node 111*b*.

The second radio network node 111*b* may further comprise a memory 1306. The memory may comprise one or more memory units to be used to store data on, such as e.g. resource configurations information regarding the retransmissions, PUSCH resource table, software, patches, system information (SI), configurations, diagnostic data, performance data and/or applications to perform the methods disclosed herein when being executed, and similar.

The method according to the embodiments described herein for the second radio network node 111*b* may be implemented by means of e.g. a computer program product 1306, 1401 or a computer program, comprising instructions, i.e., software code portions, which, when executed on at least one processor, cause at least one processor to carry out the actions described herein, as performed by the second radio network node 111*b*. The computer program product 1306, 1401 may be stored on a computer-readable storage medium 1307, 1402, e.g. a disc or similar. The computer-readable storage medium 1307, 1402, having stored thereon the computer program, may comprise instructions which, when executed on at least one processor, cause the at least one processor to carry out the actions described herein, as performed by the second radio network node 111*b*. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the second radio network node 111*b*.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

Figure 15:
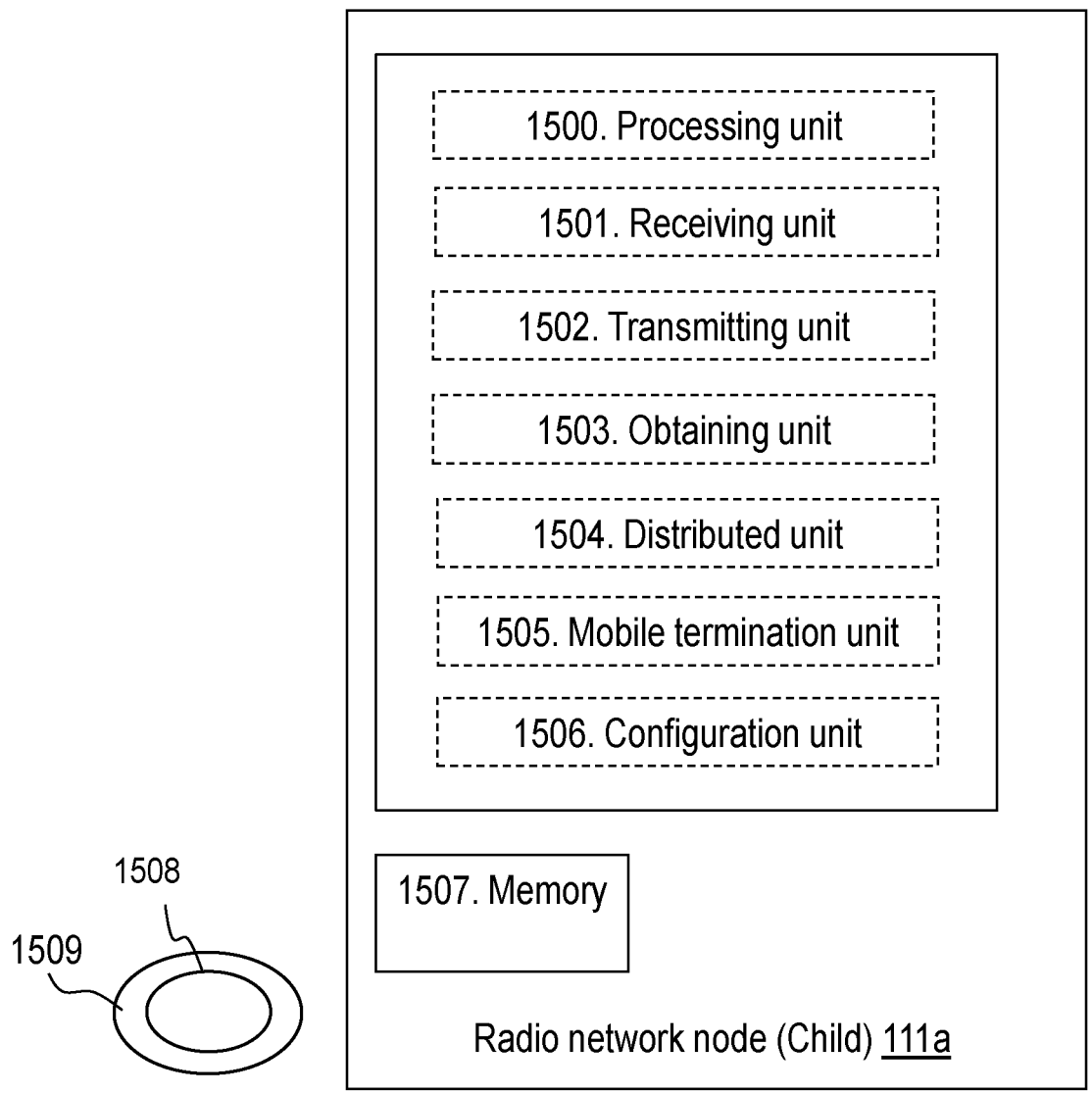
FIG. 15 is a schematic block diagram illustrating some first embodiments of a first radio network node.

FIG. 15 is a block diagram depicting the first radio network node 111*b* in the wireless communication system 100, for handling resource configurations for network nodes in the IAB network. The first radio network node 111*a* may have a wireless connection to one or more second radio network nodes 111*b* and/or a network node 110 having a wired connection to a core network of the wireless communications system.

The first radio network node 111*a* may comprise a processing unit 1500, such as e.g. one or more processors, a receiving unit 1501, a transmitting unit 1502, an obtaining unit 1503, a distributed unit 1504, a mobile termination unit 1505 and/or a configuration unit 1506 as exemplifying hardware units configured to perform the method as described herein for the first radio network node 111*a*.

The first radio network node 111*a* may be configured to, e.g. by means of the processing unit 1500 and/or the receiving unit 1501 and/or the obtaining unit 1503 and/or the distributed unit 1504 and/or the mobile termination unit 1505 being configured to, obtain the message indicating a resource configuration for the first radio network node 111a. The message may indicate a changed resource configuration for the first radio network node 111a.

The first radio network node 111a may be configured to, e.g. by means of the processing unit 1500 and/or the distributed unit 1504 and/or the configuration unit 1506 being configured to, apply the changed resource configuration according received in the message.

The first radio network node 111a may be configured to, e.g. by means of the processing unit 1500 and/or the receiving unit 1502 and/or the distributed unit 1504 being configured to, receive, from the network node 110, a resource indication message comprising the changed resource configuration for the first radio network node 111a, in order to obtain the message indicating the changed resource configuration.

The first radio network node 111a may be configured to, e.g. by means of the processing unit 1500 and/or the receiving unit 1502 and/or the distributed unit 1504 being configured to, receive the resource indication message as an application protocol message over an F1 interface from the network node 110.

The first radio network node 111a may be configured to, e.g. by means of the processing unit 1500 and/or the receiving unit 1502 and/or the mobile termination (MT) unit 1505 being configured to, receive, from at least one second radio network node 111b, a resource indication message comprising the resource configuration for the first radio network node 111a, in order to obtain the message indicating the changed resource configuration.

The first radio network node 111a may be configured to, e.g. by means of the processing unit 1500 and/or the receiving unit 1502 and/or the mobile termination unit 1505 being configured to, receive the resource indication message as an RRC message from the one or more second radio network nodes 111b.

The first radio network node 111a may be configured to, e.g. by means of the processing unit 1500 and/or the receiving unit 1502 and/or the mobile termination unit 1505 being configured to, receive the RRC message from the one or more second radio network nodes 111b encapsulated in an adaption header comprising header information according to the F1 interface, such that the first radio network node 111a handles the RRC message as an application protocol message received over the F1 interface.

Figure 16:
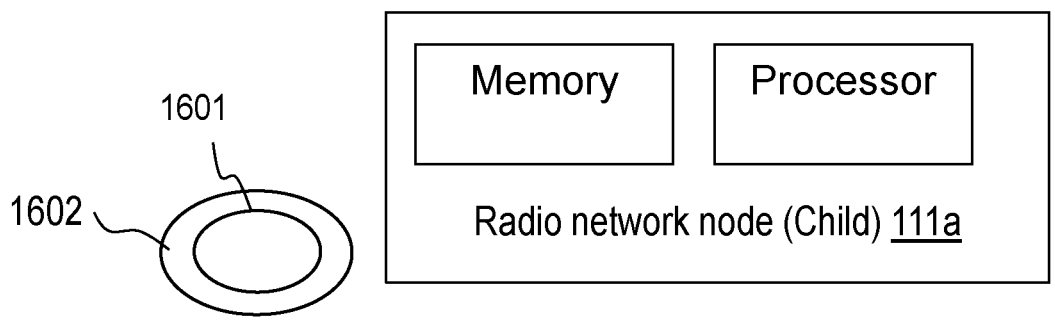
FIG. 16 is a schematic block diagram illustrating some second embodiments of the first radio network node.

The embodiments herein may be implemented through a respective processor or one or more processors of a processing circuitry in the first radio network node 111a as depicted in FIG. 16, which processing circuitry is configured to perform the method actions according to FIG. 10 and the embodiments described above for the first radio network node 111a and/or the child IAB node, such as e.g. IAB7, described herein.

The embodiments may be performed by the processor together with respective computer program code for performing the functions and actions of the embodiments herein described for the first radio network node 111a. The program code mentioned above may also be provided as a computer program product, for instance in the form of a data carrier carrying computer program code for performing the embodiments herein when being loaded into the first radio network node 111a. One such carrier may be in the form of a CD ROM disc. It is however feasible with other data carriers such as e.g. a memory stick. The computer program code may furthermore be provided as pure program code on a server and downloaded to the first radio network node 111a.

The first radio network node 111a may further comprise a memory 1507. The memory may comprise one or more memory units to be used to store data on, such as e.g. resource configurations information regarding the retransmissions, PUSCH resource table, software, patches, system information (SI), configurations, diagnostic data, performance data and/or applications to perform the methods disclosed herein when being executed, and similar.

The method according to the embodiments described herein for the first radio network node 111a may be implemented by means of e.g. a computer program product 1508, 1601 or a computer program, comprising instructions, i.e., software code portions, which, when executed on at least one processor, cause at least one processor to carry out the actions described herein, as performed by the first radio network node 111a. The computer program product 1508, 1601 may be stored on a computer-readable storage medium 1509, 1602, e.g. a disc or similar. The computer-readable storage medium 1509, 1602, having stored thereon the computer program, may comprise instructions which, when executed on at least one processor, cause the at least one processor to carry out the actions described herein, as performed by the first radio network node 111a. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the first radio network node 111a.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

It shall be noted that the nodes mentioned herein may be arranged as separate nodes or may be collocated within one or more nodes in the communications network. When a plurality of nodes is collocated in one node, the single node may be configured to perform the actions of each of the collocated nodes.

Further Extensions and Variations

Figure 17:
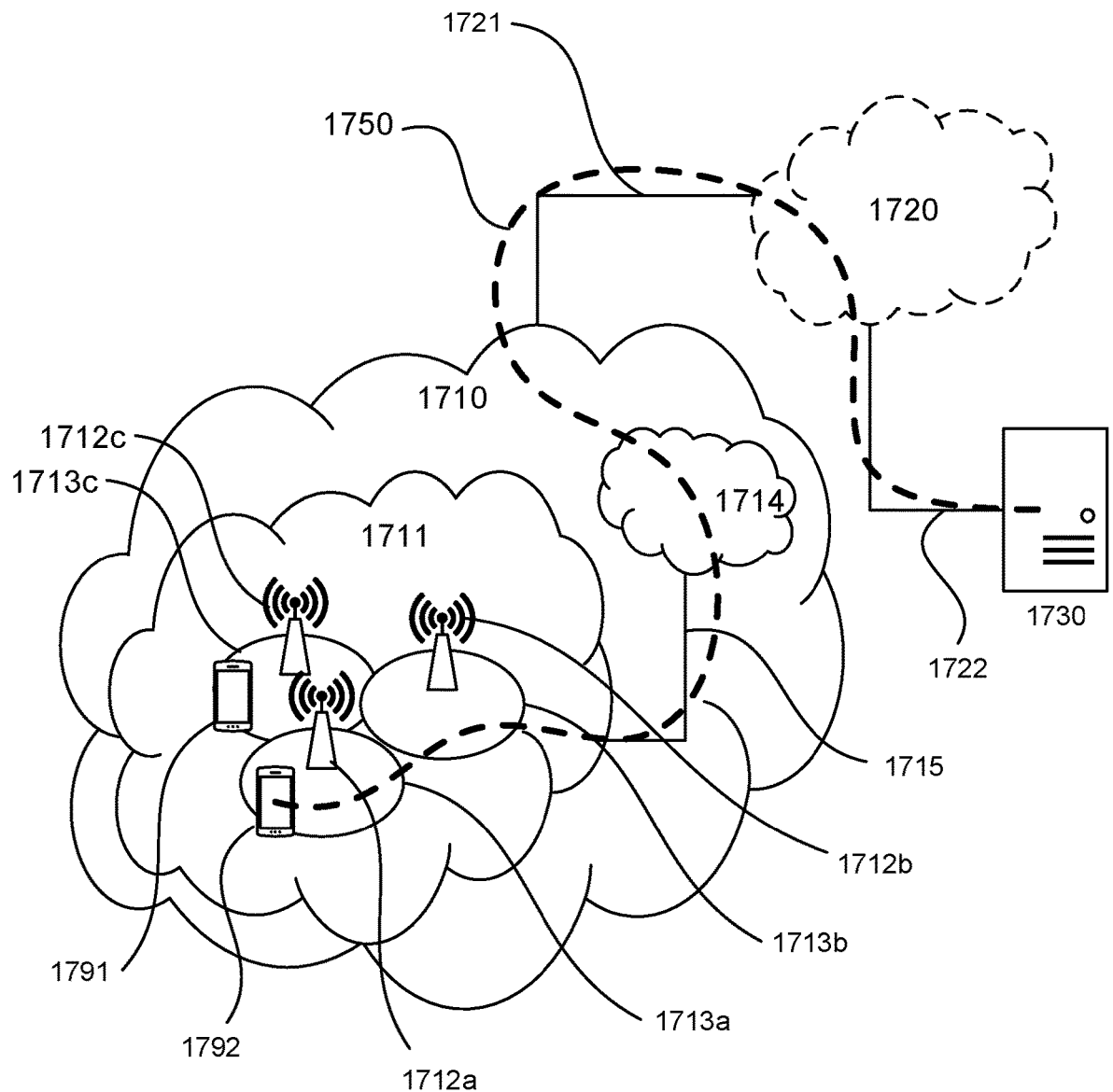
FIG. 17 is a schematic block diagram illustrating a host computer communicating via a base station with a user equipment over a partially wireless connection in accordance with some embodiments.

With reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations 1712a, 1712b, 1712c, e.g. the network node 110, such as NBs, eNBs, gNBs or other types of wireless access points, each defining a corresponding coverage area 1713a, 1713b, 1713c. Each base station 1712a, 1712b, 1712c is connectable to core network 1714 over a wired or wireless connection 1715. A first UE 1791, such as the UE 120, located in coverage area 1713c is configured to wirelessly connect to, or be paged by, the corresponding base station 1712c. A second UE 1792 in coverage area 1713a is wirelessly connectable to the corresponding base station 1712a. While a plurality of UEs 1791, 1792 are illustrated in this example, the disclosed embodiments are equally applicable to a situation where a sole UE is in the coverage area or where a sole UE is connecting to the corresponding base station 1712.

Telecommunication network 1710 is itself connected to host computer 1730, which may be embodied in the hardware and/or software of a standalone server, a cloud-implemented server, a distributed server or as processing resources in a server farm. Host computer 1730 may be under the ownership or control of a service provider, or may be operated by the service provider or on behalf of the service provider. Connections 1721 and 1722 between telecommunication network 1710 and host computer 1730 may extend directly from core network 1714 to host computer 1730 or may go via an optional intermediate network 1720. Intermediate network 1720 may be one of, or a combination of more than one of, a public, private or hosted network; intermediate network 1720, if any, may be a backbone network or the Internet; in particular, intermediate network 1720 may comprise two or more sub-networks (not shown).

The communication system of FIG. 16 as a whole enables connectivity between the connected UEs 1791, 1792 and host computer 1730. The connectivity may be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 may be transparent in the sense that the participating communication devices through which OTT connection 1750 passes are unaware of routing of uplink (UL) and downlink (DL) communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Example implementations, in accordance with an embodiment, of the UE, base station and host computer discussed in the preceding paragraphs will now be described with reference to FIG. 18. In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which may have storage and/or processing capabilities. In particular, processing circuitry 1818 may comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 may be operable to provide a service to a remote user, such as UE 1830 connecting via OTT connection 1850 terminating at UE 1830 and host computer 1810. In providing the service to the remote user, host application 1812 may provide user data which is transmitted using OTT connection 1850.

Communication system 1800 further includes base station 1820 provided in a telecommunication system and comprising hardware 1825 enabling it to communicate with host computer 1810 and with UE 1830. Hardware 1825 may include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 may be configured to facilitate connection 1860 to host computer 1810. Connection 1860 may be direct or it may pass through a core network (not shown in FIG. 18) of the telecommunication system and/or through one or more intermediate networks outside the telecommunication system. In the embodiment shown, hardware 1825 of base station 1820 further includes processing circuitry 1828, which may comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 further includes UE 1830 already referred to. Its hardware 1835 may include radio interface 1837 configured to set up and maintain wireless connection 1870 with a base station serving a coverage area in which UE 1830 is currently located. Hardware 1835 of UE 1830 further includes processing circuitry 1838, which may comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 may be operable to provide a service to a human or non-human user via UE 1830, with the support of host computer 1810. In host computer 1810, an executing host application 1812 may communicate with the executing client application 1832 via OTT connection 1850 terminating at UE 1830 and host computer 1810. In providing the service to the user, client application 1832 may receive request data from host application 1812 and provide user data in response to the request data. OTT connection 1850 may transfer both the request data and the user data. Client application 1832 may interact with the user to generate the user data that it provides.

Figure 18:
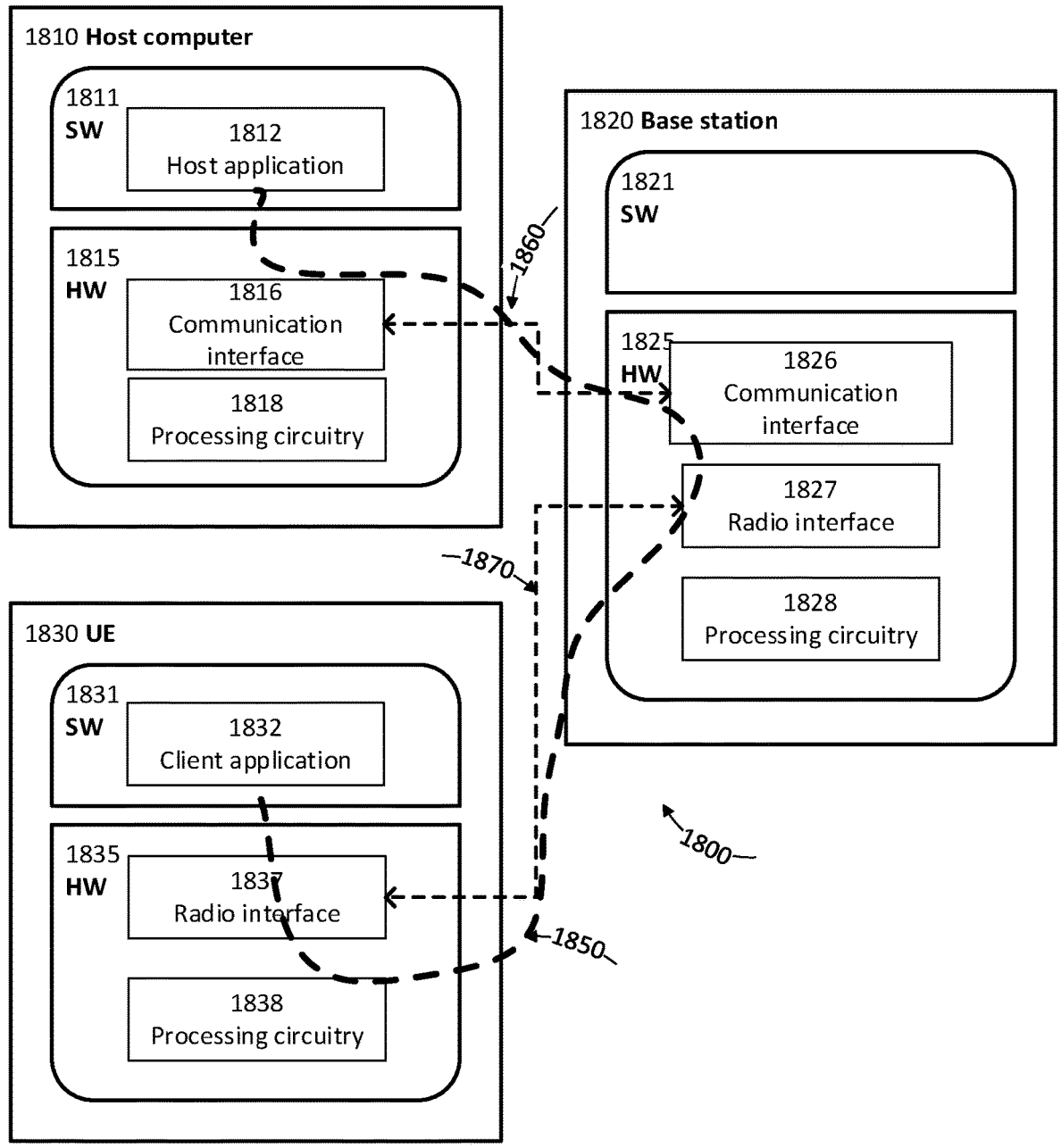
FIG. 18 is a schematic overview of a host computer communicating via a base station with a user equipment over a partially wireless connection in accordance with some embodiments.

It is noted that host computer 1810, base station 1820 and UE 1830 illustrated in FIG. 18 may be similar or identical to host computer 1730, one of base stations 1712a, 1712b, 1712c and one of UEs 1791, 1792 of FIG. 17, respectively. This is to say, the inner workings of these entities may be as shown in FIG. 18 and independently, the surrounding network topology may be that of FIG. 17.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure may determine the routing, which it may be configured to hide from UE 1830 or from the service provider operating host computer 1810, or both. While OTT connection 1850 is active, the network infrastructure may further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure.

One or more of the various embodiments improve the performance of OTT services provided to UE 1830 using OTT connection 1850, in which wireless connection 1870 forms the last segment. More precisely, by informing the parent nodes of changes in a configuration of the child nodes according to the embodiments herein the resource allocation may be improved and thereby provide benefits such as reduced latency and increased throughput of the communications network.

A measurement procedure may be provided for the purpose of monitoring data rate, latency and other factors on which the one or more embodiments improve. There may further be an optional network functionality for reconfiguring OTT connection 1850 between host computer 1810 and UE 1830, in response to variations in the measurement results. The measurement procedure and/or the network functionality for reconfiguring OTT connection 1850 may be implemented in software 1811 and hardware 1815 of host computer 1810 or in software 1831 and hardware 1835 of UE 1830, or both. In embodiments, sensors (not shown) may be deployed in or in association with communication devices through which OTT connection 1850 passes; the sensors may participate in the measurement procedure by supplying values of the monitored quantities exemplified above, or supplying values of other physical quantities from which software 1811, 1831 may compute or estimate the monitored quantities. The reconfiguring of OTT connection 1850 may include message format, retransmission settings, preferred routing etc.; the reconfiguring need not affect base station 1820, and it may be unknown or imperceptible to base station 1820. Such procedures and functionalities may be known and practiced in the art. In certain embodiments, measurements may involve proprietary UE signaling facilitating host computer 1810's measurements of throughput, propagation times, latency and the like. The measurements may be implemented in that software 1811 and 1831 causes messages to be transmitted, in particular empty or 'dummy' messages, using OTT connection 1850 while it monitors propagation times, errors etc.

Figures 19, 20:
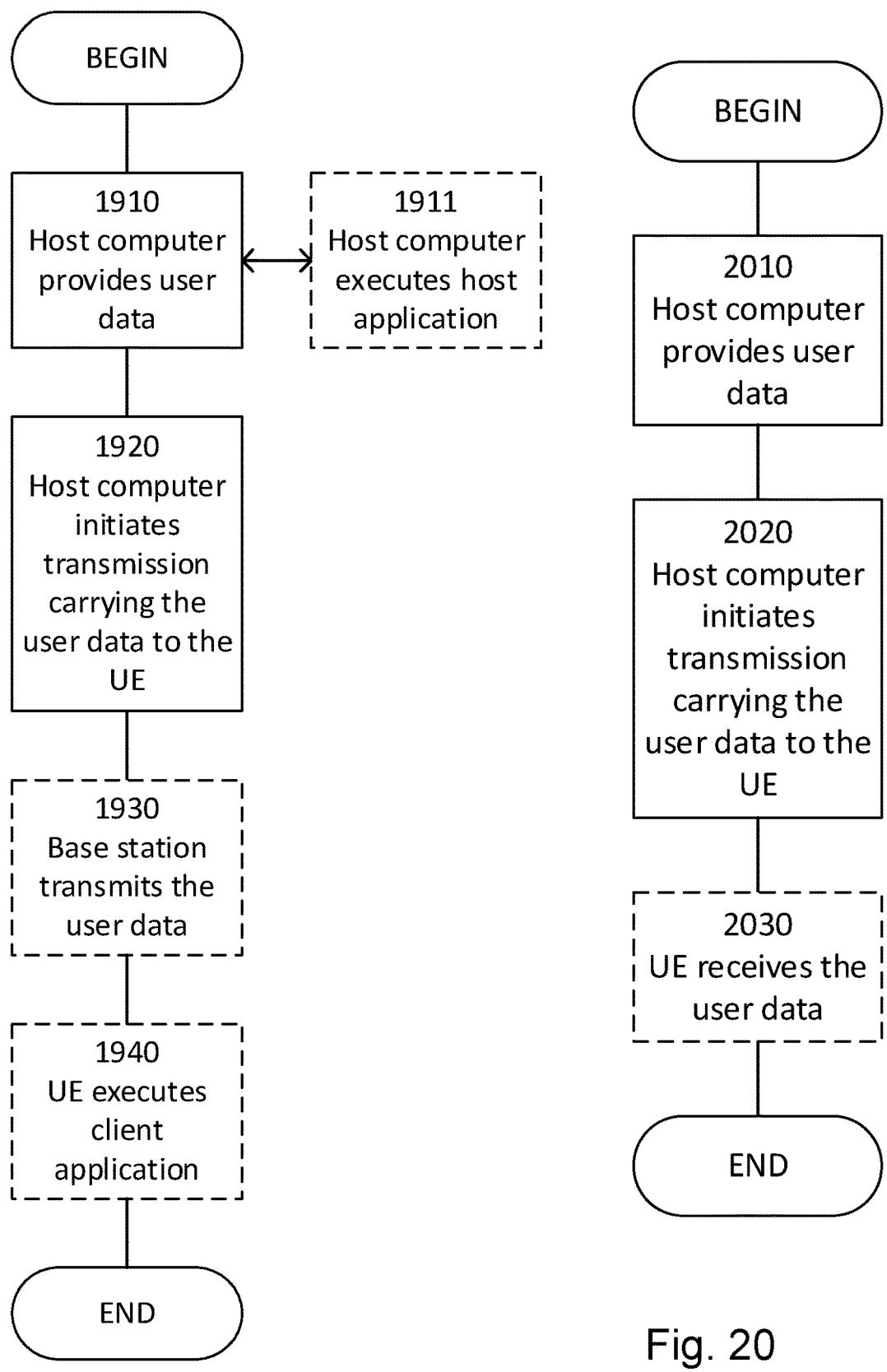
FIG. 19 is a flowchart depicting methods implemented in a communication system including a host computer, a base station and a user equipment in accordance with some embodiments.
FIG. 20 is a flowchart depicting methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step 1910, the host computer provides user data. In substep 1911 (which may be optional) of step 1910, the host computer provides the user data by executing a host application. In step 1920, the host computer initiates a transmission carrying the user data to the UE. In step 1930 (which may be optional), the base station transmits to the UE the user data which was carried in the transmission that the host computer initiated, in accordance with the teachings of the embodiments described throughout this disclosure. In step 1940 (which may also be optional), the UE executes a client application associated with the host application executed by the host computer.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step 2010 of the method, the host computer provides user data. In an optional substep (not shown) the host computer provides the user data by executing a host application. In step 2020, the host computer initiates a transmission carrying the user data to the UE. The transmission may pass via the base station, in accordance with the teachings of the embodiments described throughout this disclosure. In step 2030 (which may be optional), the UE receives the user data carried in the transmission.

Figure 21:
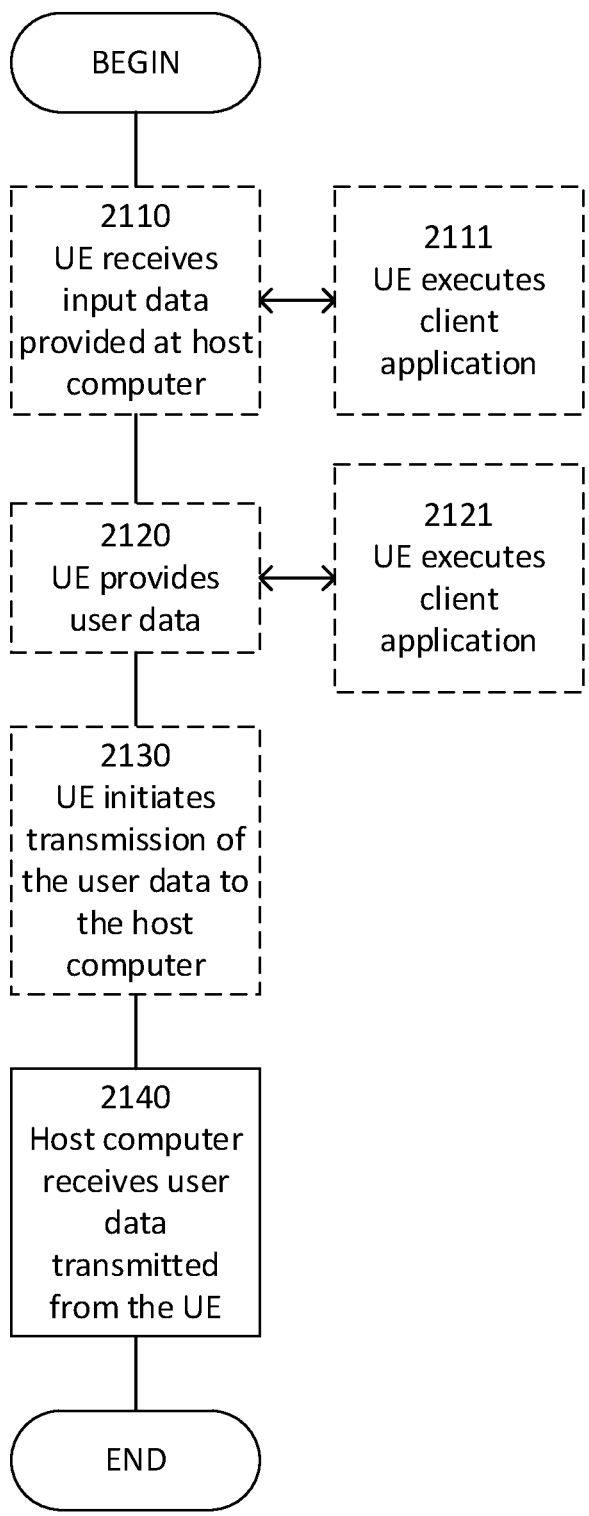
FIG. 21 is a flowchart depicting methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step 2110 (which may be optional), the UE receives input data provided by the host computer. Additionally or alternatively, in step 2120, the UE provides user data. In substep 2121 (which may be optional) of step 2120, the UE provides the user data by executing a client application. In substep 2111 (which may be optional) of step 2110, the UE executes a client application which provides the user data in reaction to the received input data provided by the host computer. In providing the user data, the executed client application may further consider user input received from the user. Regardless of the specific manner in which the user data was provided, the UE initiates, in substep 2130 (which may be optional), transmission of the user data to the host computer. In step 2140 of the method, the host computer receives the user data transmitted from the UE, in accordance with the teachings of the embodiments described throughout this disclosure.

Figure 22:
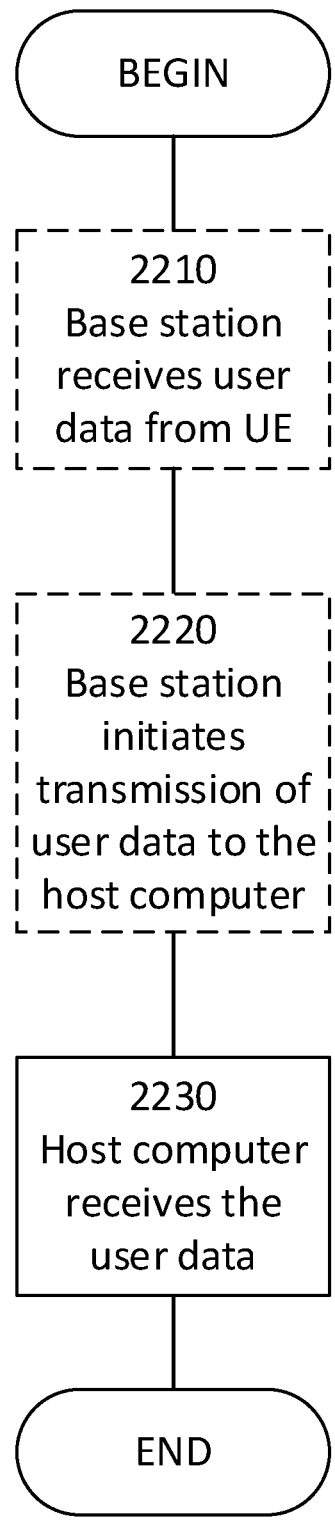
FIG. 22 is a flowchart depicting methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step 2210 (which may be optional), in accordance with the teachings of the embodiments described throughout this disclosure, the base station receives user data from the UE. In step 2220 (which may be optional), the base station initiates transmission of the received user data to the host computer. In step 2230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

NUMBERED EMBODIMENTS IN PARTICULAR RELATED TO FIGS. 17-22

1. A network node configured to communicate with a User Equipment (UE), the network node comprising a radio interface and processing circuitry configured to:
   provide, to a first radio network node and to at least one second radio network node, a message indicating a resource configuration for the first radio network node, wherein the at least one second radio network node is a parent node to the first radio network node and the first radio network node is a child node to the at least one second radio network node.
2. The network node according to embodiment 1, wherein the network node has a wired connection to the core network of the wireless communication system and a wireless connection to the at least one radio network node.
3. The network node according to any of embodiment 1 and 2, wherein network node is configured to provide the message indicating the resource configuration for the first radio network node by:
   sending, to the first radio network node, a resource indication message comprising the resource configuration for the first radio network node; and
   sending, to the at least one second radio network node, a resource indication message comprising the resource configuration for the first radio network node.
4. The network node according to embodiment 3, wherein the resource indication message sent to the at least one second radio network node comprises an information element indicating that the resource configuration concerns the first radio network node.
5. The network node according to embodiment 3 or 4, wherein the network node is configured to send the at least one sent resource indication message as an application protocol message sent over an F1 interface.
6. The network node according to any of embodiments 1 and 2, wherein network node (100) is configured to provide the message indicating the resource configuration for the first radio network node (111a) by:
   embedding a message comprising the resource configuration for the first radio network node (111a) in at least one of the message which is to be sent to the at least one second radio network node (111b), wherein the embedded message is to be forwarded to the first radio network node (111a) by the at least one second radio network node (111b); and
   sending, to the at least one second radio network node (111b), the message comprising the embedded message.
7. The network node according to embodiment 6, wherein both the embedded message and the at least one message comprising the embedded message comprise the resource configuration for the first radio network node.
8. The network node according to any of embodiments 6 and 7, wherein the network node is configured to send the at least one message comprising the embedded message as an application protocol message sent over an F1 interface and the embedded second message as a Radio Resource Control, RRC, message.
9. The network node according to any of embodiments 6 to 8, wherein the network node is configured to embed the message in a transparent container in the at least one message sent to the at least one second radio network node.
10. A communication system including a host computer comprising:
    processing circuitry configured to provide user data; and
    a communication interface configured to forward the user data to a cellular network for transmission to a User Equipment (UE), wherein the cellular network comprises a network node having a radio interface and processing circuitry, the network node's processing circuitry configured to provide, to a first network node and to at least one second radio network node, a message indicating a resource configuration for the first radio network node, wherein the at least one second radio network node is a parent node to the first radio network node and the first radio network node is a child node to the at least one second radio network node.
11. The communication system of embodiment 10, further including the network node.
12. The communication system of embodiment 11, further including the UE, wherein the UE is configured to communicate with the network node.
13. The communication system of embodiment 12, wherein: the processing circuitry of the host computer is configured to execute a host application, thereby providing the user data; and the UE comprises processing circuitry configured to execute a client application associated with the host application.
14. A method implemented in a network node, comprising providing, to a first radio network node and to at least one second radio network node, a message indicating a resource configuration for the first radio network node, wherein the at least one second radio network node is a parent node to the first radio network node and the first radio network node is a child node to the at least one second radio network node.
15. A method implemented in a communication system including a host computer, a network node and a User Equipment (UE), the method comprising:
    at the host computer, providing user data; and at the host computer, initiating a transmission carrying the user data to the UE via a cellular network comprising the network node, wherein the network node
    providing, to a first radio network node and to at least one second radio network node, a message indicating a resource configuration for the first radio network node, wherein the at least one second radio network node is a parent node to the first radio network node and the first radio network node is a child node to the at least one second radio network node.
16. The method of embodiment 15, further comprising: at the network node, transmitting the user data.
17. The method of embodiment 16, wherein the user data is provided at the host computer by executing a host application, the method further comprising: at the UE, executing a client application associated with the host application.
18. A User Equipment (UE) configured to communicate with a network node, the UE comprising a radio interface and processing circuitry configured to transmit and receive data to and from the network node.
19. A communication system including a host computer comprising:
processing circuitry configured to provide user data; and a communication interface configured to forward user data to a cellular network for transmission to a User Equipment (UE), wherein the UE comprises a radio interface and processing circuitry, the UE's processing circuitry configured to transmit and receive data to and from a network node.
20. The communication system of embodiment 19, further including the UE.
21. The communication system of embodiment 19, wherein the cellular network further includes a network node configured to communicate with the UE.
22. The communication system of embodiment 20 or 21, wherein: the processing circuitry of the host computer is configured to execute a host application, thereby providing the user data; and the UE's processing circuitry is configured to execute a client application associated with the host application.
23. A method implemented in a communication system including a host computer, a network node and a User Equipment (UE), the method comprising: at the host computer, providing user data; and at the host computer, initiating a transmission carrying the user data to the UE via a cellular network comprising the network node, wherein the UE transmits and receives to and from the network node.
24. The method of embodiment 23, further comprising at the UE, receiving the user data from the network node.
25. A communication system including a host computer comprising:
a communication interface configured to receive user data originating from a transmission from a User Equipment (UE) to a network node, wherein the UE comprises a radio interface and processing circuitry, the UE's processing circuitry configured to transmit and receive data to and from the network node.
26. The communication system of embodiment 25, further including the UE.
27. The communication system of embodiment 25, further including the network node, wherein the network node comprises a radio interface configured to communicate with the UE and a communication interface configured to forward to the host computer the user data carried by a transmission from the UE to the network node.
28. The communication system of embodiment 26 or 27, wherein: the processing circuitry of the host computer is configured to execute a host application; and the UE's processing circuitry is configured to execute a client application associated with the host application, thereby providing the user data.
29. The communication system of embodiment 26 or 27, wherein: the processing circuitry of the host computer is configured to execute a host application, thereby providing request data; and the UE's processing circuitry is configured to execute a client application associated with the host application, thereby providing the user data in response to the request data.

30. A method implemented in a User Equipment (UE), comprising transmitting and receiving data to and from a network node.
31. The method of embodiment 30, further comprising: providing user data; and forwarding the user data to a host computer via the transmission to the network node.
32. A method implemented in a communication system including a host computer, a network node and a User Equipment (UE), the method comprising: at the host computer, receiving user data transmitted to the network node from the UE, wherein the UE transmitting and receiving data to and from the network node.
33. The method of embodiment 32, further comprising: at the UE, providing the user data to the network node.
34. The method of embodiment 33, further comprising: at the UE, executing a client application, thereby providing the user data to be transmitted; and at the host computer, executing a host application associated with the client application.
35. The method of embodiment 34, further comprising: at the UE, executing a client application; and at the UE, receiving input data to the client application, the input data being provided at the host computer by executing a host application associated with the client application, wherein the user data to be transmitted is provided by the client application in response to the input data.
36. A communication system including a host computer comprising a communication interface configured to receive user data originating from a transmission from a User Equipment (UE) to a network node, wherein the network node comprises a radio interface and processing circuitry, the network node's processing circuitry configured to provide, to a first radio network node and to at least one second radio network node, a message indicating a resource configuration for the first radio network node, wherein the at least one second radio network node is a parent node to the first radio network node and the first radio network node is a child node to the at least one second radio network node.
37. The communication system of embodiment 36, further including the network node.
38. The communication system of embodiment 37, further including the UE, wherein the UE is configured to communicate with the network node.
39. The communication system of embodiment 38, wherein: the processing circuitry of the host computer is configured to execute a host application; the UE is configured to execute a client application associated with the host application, thereby providing the user data to be received by the host computer.
40. A method implemented in a communication system including a host computer, a network node and a User Equipment (UE), the method comprising: at the host computer, receiving, from the network node, user data originating from a transmission which the network node has received from the UE, wherein the UE transmits and receives data to and from the network node.
41. The method of embodiment 40, further comprising: at the network node, receiving the user data from the UE.
42. The method of embodiment 41, further comprising: at the network node, initiating a transmission of the received user data to the host computer.
43. A second radio network node configured to communicate with a User Equipment (UE), the second radio network node comprising a radio interface and processing circuitry configured to:

receive, from the network node, a message indicating a resource configuration for a first radio network node of the at least one radio network node, wherein the first radio network node is a child node of the second radio network node.

44. The second radio network node according to embodiment 43, wherein the second radio network node is further configured to:
store the received resource configuration of the first radio network node.

45. The second radio network node according to any of embodiment 43 and 44, wherein the received message comprises an information element indicating that the resource configuration concerns the first radio network node.

46. The second radio network node according to any of embodiments 43 to 45, wherein the received message comprises an embedded message to be forwarded to the first radio network node, wherein the embedded message comprises the resource configuration for the first radio network node, the second radio network node further is configured to:
send, to the first radio network node, the embedded message comprising the resource configuration for the first radio network node.

47. The second radio network node according to embodiments 46, wherein both the received message and the embedded message comprise the resource configuration for the first radio network node.

48. The second radio network node according to any of embodiments 46 and 47, wherein the second radio network node is configured to receive the message as an application protocol message over an F1 interface and the embedded message as a Radio Resource Control, RRC, message.

49. The second radio network node according to any of embodiments 46 to 48, wherein the second radio network node is configured to receive the embedded message in a transparent container in the received message.

50. The second radio network node according to embodiment 49, wherein the second radio network node is further configured to encapsulate the embedded message in an adaption header comprising header information according to the F1 interface prior to sending the embedded message to the first radio network node.

51. A communication system including a host computer comprising:
processing circuitry configured to provide user data; and a communication interface configured to forward the user data to a cellular network for transmission to a User Equipment (UE), wherein the cellular network comprises a second radio network node having a radio interface and processing circuitry, the base station's processing circuitry configured to receive, from the network node, a message indicating a resource configuration for a first radio network node of the at least one radio network node, wherein the first radio network node is a child node of the second radio network node.

52. The communication system of embodiment 51, further including the second radio network node.

53. The communication system of embodiment 52, further including the UE, wherein the UE is configured to communicate with the second radio network node.

54. The communication system of embodiment 53, wherein: the processing circuitry of the host computer is configured to execute a host application, thereby providing the user data; and the UE comprises processing circuitry configured to execute a client application associated with the host application.

55. A method implemented in a second radio network node, comprising
receiving, from a network node, a message indicating a resource configuration for a first radio network node of the at least one radio network node, wherein the first radio network node is a child node of the second radio network node.

56. A method implemented in a communication system including a host computer, a second radio network node and a User Equipment (UE), the method comprising: at the host computer, providing user data; and at the host computer, initiating a transmission carrying the user data to the UE via a cellular network comprising the second radio network node, wherein the second radio network node
receiving, from the network node, a message indicating a resource configuration for a first radio network node of the at least one radio network node, wherein the first radio network node is a child node of the second radio network node.

57. The method of embodiment 56, further comprising: at the second radio network node, transmitting the user data.

58. The method of embodiment 57, wherein the user data is provided at the host computer by executing a host application, the method further comprising: at the UE, executing a client application associated with the host application.

59. A User Equipment (UE) configured to communicate with a second radio network node, the UE comprising a radio interface and processing circuitry configured to transmit and receive data to and from the second radio network node.

60. A communication system including a host computer comprising: processing circuitry configured to provide user data; and a communication interface configured to forward user data to a cellular network for transmission to a User Equipment (UE), wherein the UE comprises a radio interface and processing circuitry, the UE's processing circuitry configured to transmit and receive data to and from a second radio network node.

61. The communication system of embodiment 60, further including the UE.

62. The communication system of embodiment 60, wherein the cellular network further includes a second radio network node configured to communicate with the UE.

63. The communication system of embodiment 61 or 62, wherein: the processing circuitry of the host computer is configured to execute a host application, thereby providing the user data; and the UE's processing circuitry is configured to execute a client application associated with the host application.

64. A method implemented in a communication system including a host computer, a second radio network node and a User Equipment (UE), the method comprising:
at the host computer, providing user data; and at the host computer, initiating a transmission carrying the user data to the UE via a cellular network comprising second radio network node, wherein the UE transmits and receives to and from the second radio network node.

65. The method of embodiment 64, further comprising: at the UE, receiving the user data from the second radio network node.

66. A communication system including a host computer comprising: a communication interface configured to receive user data originating from a transmission from a User Equipment (UE) to a second radio network node, wherein the UE comprises a radio interface and processing circuitry, the UE's processing circuitry configured to transmit and receive data to and from the second radio network node.

67. The communication system of embodiment 66, further including the UE.

68. The communication system of embodiment 67, further including the second radio network node, wherein the second radio network node comprises a radio interface configured to communicate with the UE and a communication interface configured to forward to the host computer the user data carried by a transmission from the UE to the second radio network node.

69. The communication system of embodiment 67 or 68, wherein: the processing circuitry of the host computer is configured to execute a host application; and the UE's processing circuitry is configured to execute a client application associated with the host application, thereby providing the user data.

70. The communication system of embodiment 67 or 68, wherein: the processing circuitry of the host computer is configured to execute a host application, thereby providing request data; and the UE's processing circuitry is configured to execute a client application associated with the host application, thereby providing the user data in response to the request data.

71. A method implemented in a User Equipment (UE), comprising transmitting and receiving data to and from a second radio network node.

72. The method of embodiment 71, further comprising: providing user data; and forwarding the user data to a host computer via the transmission to the second radio network node.

73. A method implemented in a communication system including a host computer, a second radio network node and a User Equipment (UE), the method comprising: at the host computer, receiving user data transmitted to the second radio network node from the UE, wherein the UE transmitting and receiving data to and from the second radio network node.

74. The method of embodiment 73, further comprising: at the UE, providing the user data to the second radio network node.

75. The method of embodiment 74, further comprising: at the UE, executing a client application, thereby providing the user data to be transmitted; and at the host computer, executing a host application associated with the client application.

76. The method of embodiment 75, further comprising: at the UE, executing a client application; and at the UE, receiving input data to the client application, the input data being provided at the host computer by executing a host application associated with the client application, wherein the user data to be transmitted is provided by the client application in response to the input data.

77. A communication system including a host computer comprising a communication interface configured to receive user data originating from a transmission from a User Equipment (UE) to a second radio network node, wherein the second radio network node comprises a radio interface and processing circuitry, the second radio network node's processing circuitry configured to receive, from the network node, a message indicating a resource configuration for a first radio network node of the at least one radio network node, wherein the first radio network node is a child node of the second radio network node.

78. The communication system of embodiment 77, further including the second radio network node.

79. The communication system of embodiment 78, further including the UE, wherein the UE is configured to communicate with the second radio network node.

80. The communication system of embodiment 79, wherein: the processing circuitry of the host computer is configured to execute a host application; the UE is configured to execute a client application associated with the host application, thereby providing the user data to be received by the host computer.

81. A method implemented in a communication system including a host computer, a second radio network node and a User Equipment (UE), the method comprising: at the host computer, receiving, from the second radio network node, user data originating from a transmission which the second radio network node has received from the UE, wherein the UE transmits and receives data to and from the second radio network node.

82. The method of embodiment 81, further comprising: at the second radio network node, receiving the user data from the UE.

83. The method of embodiment 82, further comprising: at the second radio network node, initiating a transmission of the received user data to the host computer.

84. A first radio network node configured to communicate with a User Equipment (UE), the first radio network node comprising a radio interface and processing circuitry configured to:
receive, from at least one of the at least one second radio network node, a resource indication message comprising the resource configuration for the first network node.

85. The first radio network node according to embodiment 85, wherein the first radio network node is further configured to:
apply the resource configuration.

86. The first radio network node according to any of embodiment 84 and 85, wherein the first radio network node is configured to receive the resource indication message as a Radio Resource Control, RRC, message from the at least one second radio network nodes.

87. The first radio network node according to embodiment 86, wherein the first radio network node is configured to receive the RRC message from the at least one second radio network node encapsulated in an adaption header comprising header information according to the F1 interface, such that the first radio network node handles the RRC message as an application protocol message received over an F1 interface.

88. A communication system including a host computer comprising: processing circuitry configured to provide user data; and a communication interface configured to forward the user data to a cellular network or transmission to a User Equipment (UE), wherein the cellular network comprises a first radio network node having a radio interface and processing circuitry, the base station's processing circuitry configured to receive, from at least one of the at least one second radio network node, a resource indication message comprising the resource configuration for the first network node.

89. The communication system of embodiment 88, further including the first radio network node.

90. The communication system of embodiment 89, further including the UE, wherein the UE is configured to communicate with the first radio network node.

91. The communication system of embodiment 90, wherein: the processing circuitry of the host computer is configured to execute a host application, thereby providing the user data; and the UE comprises processing circuitry configured to execute a client application associated with the host application.

92. A method implemented in a first radio network node, comprising
receiving, from at least one of the at least one second radio network node, a resource indication message comprising the resource configuration for the first network node.

93. A method implemented in a communication system including a host computer, a first radio network node and a User Equipment (UE), the method comprising: at the host computer, providing user data; and at the host computer, initiating a transmission carrying the user data to the UE via a cellular network comprising the first radio network node, wherein the first radio network node
receiving, from at least one of the at least one second radio network node, a resource indication message comprising the resource configuration for the first network node.

94. The method of embodiment 93, further comprising: at the first radio network node, transmitting the user data.

95. The method of embodiment 94, wherein the user data is provided at the host computer by executing a host application, the method further comprising: at the UE, executing a client application associated with the host application.

96. A User Equipment (UE) configured to communicate with a first radio network node, the UE comprising a radio interface and processing circuitry configured to transmit and receive data to and from the first radio network node.

97. A communication system including a host computer comprising:
processing circuitry configured to provide user data; and
a communication interface configured to forward user data to a cellular network for transmission to a User Equipment (UE), wherein the UE comprises a radio interface and processing circuitry, the UE's processing circuitry configured to transmit and receive data to and from a first radio network node.

98. The communication system of embodiment 97, further including the UE.

99. The communication system of embodiment 98, wherein the cellular network further includes a first radio network node configured to communicate with the UE.

100. The communication system of embodiment 98 or 99, wherein: the processing circuitry of the host computer is configured to execute a host application, thereby providing the user data; and the UE's processing circuitry is configured to execute a client application associated with the host application.

101. A method implemented in a communication system including a host computer, a first radio network node and a UE, the method comprising: at the host computer, providing user data; and at the host computer, initiating a transmission carrying the user data to the UE via a cellular network comprising first radio network node, wherein the UE transmits and receives to and from the first radio network node.

102. The method of embodiment 101, further comprising: at the UE, receiving the user data from the first radio network node.

103. A communication system including a host computer comprising:
a communication interface configured to receive user data originating from a transmission from a UE to a first radio network node, wherein the UE comprises a radio interface and processing circuitry, the UE's processing circuitry configured to transmit and receive data to and from the first radio network node.

104. The communication system of embodiment 103, further including the UE.

105. The communication system of embodiment 104, further including the first radio network node, wherein the first radio network node comprises a radio interface configured to communicate with the UE and a communication interface configured to forward to the host computer the user data carried by a transmission from the UE to the first radio network node.

106. The communication system of embodiment 103 or 104, wherein: the processing circuitry of the host computer is configured to execute a host application; and the UE's processing circuitry is configured to execute a client application associated with the host application, thereby providing the user data.

107. The communication system of embodiment 103 or 104, wherein: the processing circuitry of the host computer is configured to execute a host application, thereby providing request data; and the UE's processing circuitry is configured to execute a client application associated with the host application, thereby providing the user data in response to the request data.

108. A method implemented in a User Equipment (UE), comprising transmitting and receiving data to and from a first radio network node.

109. The method of embodiment 108, further comprising: providing user data; and forwarding the user data to a host computer via the transmission to the first radio network node.

110. A method implemented in a communication system including a host computer, a first radio network node and a UE, the method comprising: at the host computer, receiving user data transmitted to the first radio network node from the UE, herein the UE transmitting and receiving data to and from the first radio network node.

111. The method of embodiment 110, further comprising: at the UE, providing the user data to the first radio network node.

112. The method of embodiment 111, further comprising at the UE, executing a client application, thereby providing the user data to be transmitted; and at the host computer, executing a host application associated with the client application.

113. The method of embodiment 112, further comprising: at the UE, executing a client application; and at the UE, receiving input data to the client application, the input data being provided at the host computer by executing a host application associated with the client application, wherein the user data to be transmitted is provided by the client application in response to the input data.

114. A communication system including a host computer comprising a communication interface configured to receive user data originating from a transmission from a User Equipment (UE) to a first radio network node, wherein the first radio network node comprises a radio interface and processing circuitry, the first radio network node's processing circuitry configured to receive, from at least one of the at least one second radio network node, a resource indication message comprising the resource configuration for the first network node.

115. The communication system of embodiment 114, further including the first radio network node.

116. The communication system of embodiment 115, further including the UE, wherein the UE is configured to communicate with the first radio network node.

117. The communication system of embodiment 116, wherein the processing circuitry of the host computer is configured to execute a host application; the UE is configured to execute a client application associated with the host application, thereby providing the user data to be received by the host computer.

118. A method implemented in a communication system including a host computer, a first radio network node and a UE, the method comprising: at the host computer, receiving, from the first radio network node, user data originating from a transmission which the first radio network node has received from the UE, wherein the UE transmits and receives data to and from the first radio network node.

119. The method of embodiment 118, further comprising: at the first radio network node, receiving the user data from the UE.

120. The method of embodiment 119, further comprising: at the first radio network node, initiating a transmission of the received user data to the host computer.

Below, some example embodiments 1-55 are described.

Embodiment 1. A method, performed by a network node (110) in a wireless communication system (100), for handling resource configurations for network nodes in an Integrated Access and Backhaul, IAB, network, wherein the first network node (110) has a wired connection to a core network of the wireless communications system and a wireless connection to one or more radio network nodes (111), wherein the method comprises:
provide (810), to the first radio network node (111a) out of the one or more radio network nodes (111) and to one or more second radio network nodes (111b) of the first radio network node (111a), a message indicating the changed resource configuration for the first radio network node (111a), wherein the message is sent using the wireless connection, wherein the one or more second radio network nodes is/are parent nodes to the first radio network node (111a) and the first radio network node (111a) is a child node to the one or more second radio network nodes (111b).

Embodiment 2. The method according to Embodiment 1, wherein the step of providing (810) the message comprising the resource configuration comprises:
sending (810a), to each of the first radio network node (111a) and the one or more second radio network nodes (111b) of the first radio network node (111a), a separate resource indication message comprising the changed resource configuration for the first radio network node (111a).

Embodiment 3. The method according to Embodiment 2, wherein the resource indication message sent to the second radio network nodes (111b) comprises an information element indicating that the resource configuration concerns the first radio network node (111a) being a child of the one or more second radio network nodes (111b).

Embodiment 4. The method according to Embodiment 2 or 3, wherein the resource indication message is an application protocol message sent over an F1 interface.

Embodiment 5. The method according to Embodiment 1, wherein the step of providing (810) the resource configuration comprises:
sending (810b), to each of the one or more second radio network nodes (111b) of the first radio network node (111a), a first message comprising an embedded second message to be forwarded to the first radio network node (111a), wherein the embedded second message comprises the changed resource configuration for the first radio network node (111a).

Embodiment 6. The method according to Embodiment 5, wherein both the first message and the embedded second message comprises the changed resource configuration of the first radio network node (111a).

Embodiment 7. The method according to Embodiment 5 or 6, wherein the first message is an application protocol message sent over an F1 interface and the embedded second message is a Radio Resource Control, RRC, message sent.

Embodiment 8. The method according to any of the Embodiments 5 to 7, wherein the second message is embedded in the first message in a transparent container.

Embodiment 9. The method according to any of the Embodiments 2 to 8, wherein the message is sent by means of a Centralized Unit, CU, of the network node (110).

Embodiment 10. A method, performed by a second radio network node (111b) in a wireless communication system (100), for handling resource configurations for network nodes in an integrated access and backhaul, IAB, network, wherein the second radio network node (110) has a wireless connection to one or more radio network nodes (111) and a network node (110) having a wired connection to a core network of the wireless communications system, wherein the method comprises:
receiving (910), from the network node (110), a first message indicating a changed resource configuration for a first radio network node (111a), the first radio network node being a child node of the second radio network node (111a),
storing (920) the received resource configuration of the first radio network node (111a).

Embodiment 11. The method according to Embodiment 10, wherein the first message is a resource indication message comprising an information element indicating that the resource configuration concerns the first radio network node (111a) being a child of the one or more second radio network nodes (111b).

Embodiment 12. The method according to Embodiment 10 or 11, wherein the received message comprises an embedded second message to be forwarded to the first radio network node (111a), wherein the embedded second message comprises the changed resource configuration for the first radio network node (111a), and the method further comprises:

sending (930), to the first radio network node (111a), the embedded second message comprising the changed resource configuration for the first radio network node (111a).

Embodiment 13. The method according to Embodiment 12, wherein both the first message and the embedded second message comprises the changed resource configuration of the first radio network node (111a).

Embodiment 14. The method according to Embodiment 12 or 13, wherein the first message is an application protocol message received over an F1 interface and the embedded second message is a Radio Resource Control, RRC, message.

Embodiment 15. The method according to any of the Embodiments 12 to 14, wherein the second message is embedded in the first message in a transparent container.

Embodiment 16. The method according to Embodiment 14, wherein the method further comprises encapsulating the second message in an adaption header comprising header information according to the F1 interface prior to sending the embedded second message to the first radio network node (111a).

Embodiment 17. The method according to any of the Embodiments 12 to 16, wherein the embedded second message is sent to the first radio network node (111a) by means of a Distributed Unit, DU, of the second radio network node (111b).

Embodiment 18. The method according to any of the Embodiments 10 to 17, wherein the first message is received from the network node (110) by means of a Distributed Unit, DU, of the second radio network node (111b).

Embodiment 19. A method, performed by a first radio network node (111a) in a wireless communication system (100), for handling resource configurations for network nodes in an integrated access and backhaul, IAB, network, wherein the first radio network node (111a) has a wireless connection to one or more second radio network nodes (111b) and/or a network node (110) having a wired connection to a core network of the wireless communications system, wherein the method comprises:
obtaining (1010) a message indicating a changed resource configuration for the first radio network node (111a),
applying (1030) the changed resource configuration.

Embodiment 20. The method according to Embodiment 19, wherein the obtaining (1010) of the message comprises:
receiving (1010a), from the network node (110), a resource indication message comprising the changed resource configuration for the first radio network node (111a).

Embodiment 21. The method according to Embodiment 18, wherein the resource indication message is an application protocol message received over an F1 interface from the network node (110).

Embodiment 22. The method according to any of the Embodiments 20 to 21, wherein the resource indication message is received from the network node (110) by means of a Distributed Unit, DU, of the first radio network node (111a).

Embodiment 23. The method according to Embodiment 19, wherein the obtaining (1010) of the message comprises:
receiving (1010b), from one or more second radio network nodes (111b), a resource indication message comprising the changed resource configuration for the first radio network node (111a).

Embodiment 24. The method according to Embodiment 23, wherein the resource indication message is a Radio Resource Control, RRC, message received from the one or more second radio network nodes (111b).

Embodiment 25. The method according to Embodiment 24, wherein the RRC message received from the one or more second radio network nodes (111b) is encapsulated in an adaption header comprising header information according to the F1 interface, such that the first radio network node (111a) handles the RRC message as an application protocol message received over an F1 interface.

Embodiment 26. The method according to any of the claims 23 to 25, wherein the resource configuration message is received from the one or more second radio network nodes (111b) by means of a Mobile Termination, MT, unit of the first network node (111a).

Embodiment 27. The method according to any of the previous claims, wherein the changed resource configuration for the first radio network node (111a) is a resource configuration for a Distributed Unit, DU, of the first radio network node (111a).

Embodiment 28. A network node (110) in a wireless communication system (100), for handling resource configurations for network nodes in an integrated access and backhaul, IAB, network, wherein the first network node (110) has a wired connection to a core network of the wireless communications system and a wireless connection to one or more radio network nodes (111), wherein the network node (100) is configured to:
provide, to the first radio network node (111a) out of the one or more radio network nodes (111) and to one or more second radio network nodes (111b) of the first radio network node (111a), a message indicating the changed resource configuration for the first radio network node (111a), wherein the message is provided using the wireless connection, wherein the one or more second radio network nodes is/are parent nodes to the first radio network node (111a) and the first radio network node (111a) is a child node to the one or more second radio network nodes (111b).

Embodiment 29. The network node (110) according to Embodiment 29, wherein network node is further configured to:
send, to each of the first radio network node (111a) and the one or more second radio network nodes (111b) of the first radio network node (111a), a separate resource indication message comprising the changed resource configuration for the first radio network node (111a).

Embodiment 30. The network node (110) according to Embodiment 29, wherein the network node (110) is configured to send the resource indication message sent to the second radio network nodes (111b) comprising an information element indicating that the resource configuration concerns the first radio network node (111a) being a child of the one or more second radio network nodes (111b).

Embodiment 31. The network node (110) according to Embodiment 29 or 30, wherein the network node (110)

is configured to send the resource indication message as an application protocol message sent over an F1 interface.

Embodiment 32. The network node (110) according to Embodiment 28, wherein the network node (110) is configured to:
send, to each of the one or more second radio network nodes (111b), a first message comprising an embedded second message to be forwarded to the first radio network node (111a), wherein the embedded second message comprises the changed resource configuration for the first radio network node (111a).

Embodiment 33. The network node (110) according to Embodiment 32, wherein network node (110) is configured to send the changed resource configuration of the first radio network node (111a) comprised in both the first message and the embedded second message.

Embodiment 34. The network node (110) according to Embodiment 32 or 33, wherein network node (110) is configured to send the first message as an application protocol message sent over an F1 interface and the embedded second message as a Radio Resource Control, RRC, message.

Embodiment 35. The network node (110) according to any of the Embodiments 32 to 34, wherein the network node (110) is configured to embed the second message in the first message in a transparent container.

Embodiment 36. The network node (110) according to any of the Embodiments 32 to 35, wherein the network node (110) is configured to send the message by means of a Centralized Unit, CU, of the network node (110).

Embodiment 37. A second radio network node (111b) in a wireless communication system (100), for handling resource configurations for network nodes in an integrated access and backhaul, IAB, network, wherein the second radio network node (110) has a wireless connection to one or more radio network nodes (111) and a network node (110) having a wired connection to a core network of the wireless communications system, wherein the second radio network node (111b) is configured to:
receive, from the network node (110), a first message indicating a changed resource configuration for a first radio network node (111a), the first radio network node being a child node of the second radio network node (111a),
store the received resource configuration of the first radio network node (111a).

Embodiment 38. The second radio network node (111b) according to Embodiment 37, wherein the second radio network node (111b) is configured to receive the first message as a resource indication message comprising an information element indicating that the resource configuration concerns the first radio network node (111a) being a child of the one or more second radio network nodes (111b).

Embodiment 39. The second radio network node (111b) according to Embodiment 37 or 38, wherein when the received message comprises an embedded second message to be forwarded to the first radio network node (111a), wherein the embedded second message comprises the changed resource configuration for the first radio network node (111a), the second radio network node (111b) is further configured to:
send, to the first radio network node (111a), the embedded second message comprising the changed resource configuration for the first radio network node (111a).

Embodiment 40. The second radio network node (111b) according to Embodiment 39, wherein the second radio network node (111b) is configured to send the changed resource configuration of the first radio network node (111a) comprised in both the first message and the embedded second message.

Embodiment 41. The second radio network node (111b) according to Embodiment 39 or 40, wherein the second radio network node (111b) is configured to receive the first message as an application protocol message over an F1 interface and the embedded second message as a Radio Resource Control, RRC, message.

Embodiment 42. The second radio network node (111b) according to any of the Embodiments 39 to 41, wherein the second radio network node (111b) is configured to receive the second message embedded in the first message in a transparent container.

Embodiment 43. The second radio network node (111b) according to Embodiment 41, wherein the second radio network node (111b) is further configured to encapsulate the second message in an adaption header comprising header information according to the F1 interface prior to sending the embedded second message to the first radio network node (111a).

Embodiment 44. The second radio network node (111b) according to any of the Embodiments 39 to 43, wherein the second radio network node (111b) is configured to send the embedded second message to the first radio network node (111a) by means of a Distributed Unit, DU, of the second radio network node (111b).

Embodiment 45. The second radio network node (111b) according to any of the Embodiments 37 to 44, wherein the second radio network node (111b) is configured to receive the first message from the network node (110) by means of a Distributed Unit, DU, of the second radio network node (111b).

Embodiment 46. A first radio network node (111a) in a wireless communication system (100), for handling resource configurations for network nodes in an integrated access and backhaul, IAB, network, wherein the first radio network node (111a) has a wireless connection to one or more second radio network nodes (111b) and/or a network node (110) having a wired connection to a core network of the wireless communications system, wherein the first radio network node (111a) is configured to:
obtain a message indicating a changed resource configuration for the first radio network node (111a),
apply the changed resource configuration.

Embodiment 47. The first radio network node (111a) according to Embodiment 46, wherein the first radio network node (111a) is configured to receive, from the network node (110), a resource indication message comprising the changed resource configuration for the first radio network node (111a), in order to obtain the message indicating the changed resource configuration.

Embodiment 48. The first radio network node (111a) according to Embodiment 47, wherein the first radio network node (111a) is configured to receive the resource indication message as an application protocol message over an F1 interface from the network node (110).

Embodiment 49. The first radio network node (111a) according to any of the Embodiments 47 to 48, wherein the first radio network node (111a) is configured to receive the resource indication message from the network node (110) by means of a Distributed Unit, DU, of the first radio network node (111a).

Embodiment 50. The first radio network node (111a) according to Embodiment 49, wherein the first radio network node (111a) is configured to receive, from one or more second radio network nodes (111b), a resource indication message comprising the changed resource configuration for the first radio network node (111a), in order to obtain the message indicating the changed resource configuration.

Embodiment 51. The first radio network node (111a) according to Embodiment 50, wherein the first radio network node (111a) is configured to receive the resource indication message as a Radio Resource Control, RRC, message from the one or more second radio network nodes (111b).

Embodiment 52. The first radio network node (111a) according to Embodiment 51, wherein the first radio network node (111a) is configured to receive the RRC message from the one or more second radio network nodes (111b) encapsulated in an adaption header comprising header information according to the F1 interface, such that the first radio network node (111a) handles the RRC message as an application protocol message received over an F1 interface.

Embodiment 53. The first radio network node (111a) according to any of the claims 50 to 52, wherein the first radio network node (111a) is configured to receive the resource configuration message from the one or more second radio network nodes (111b) by means of a Mobile Termination, MT, unit of the first network node (111a).

Embodiment 54. A computer program comprising instructions, which when executed by a processor, causes the processor to perform actions according to any of the Embodiments 1-27.

Embodiment 55. A carrier comprising the computer program of Embodiment 54, wherein the carrier is one of an electronic signal, an optical signal, an electromagnetic signal, a magnetic signal, an electric signal, a radio signal, a microwave signal, or a computer-readable storage medium.

DEFINITIONS

| Abbreviation | Explanation |
| --- | --- |
| ON | Core Network |
| CU | Centralized Unit |
| CU-CP | CU Control Plane |
| CU-UP | CU User Plane |
| DFTS-OFDM | Discrete Fourier Transform (DFT) Spread OFDM |
| DL | Downlink |
| DU | Distributed Unit |
| eNB | evolved Node B (a base station supporting the LTE air interface for communication with UEs) |
| EN-DC | E-UTRAN-NR Dual Connectivity |
| EPC | Evolved Packet Core |

DEFINITIONS

| Abbreviation | Explanation |
| --- | --- |
| F1 | Interface between a gNB-CU and a gNB-DU |
| F1-AP | F1 Application Protocol |
| F1* | modified form of F1 (within the IAB context; details of F1* remain to be specified; protocol translation between F1* and F1 in case the IAB donor is split is studied) F1*-Umodified form of F1 interface - User Plane |
| gNB | a base station supporting the NR air interface for communication with UEs |
| GTP-U | GPRS Tunneling Protocol - User Plane |
| IAB | Integrated Access and backhaul |
| IP | Internet Protocol |
| L1 | Layer one |
| L2 | Layer 2 |
| L-GW | LIPA Gateway (LIPA - Local IP Access) |
| LTE | Long Term Evolution |
| MAC | Medium Access Control |
| MCS | Modulation and Coding Scheme |
| N4 | Interface between SMF (Session Management Function) and UPF |
| UPF | User Plane Function in the 5GC |
| NAS | Non Access Stratum |
| NG | (logical) Interface between an gNB and 5GC (i.e. NG-RAN and 5G core network) |
| NGC | NG-C; NG Interface Control Plane |
| NR | New Radio |
| NSA | Non-Standalone |
| OAM | Operation and Maintenance |
| OFDM | Orthogonal Frequency-Division Multiplexing |
| PDCP | Packet Data Convergence Protocol |
| PDN | Packet Data Network |
| PDU | Protocol Data Unit |
| PHY | Physical layer |
| P/S-GW | S-GW: Serving Gateway (user plane node connecting EPC and LTE RAN); P-GW (PDN-GW): Packet Data Network Gateway (connects EPC to internet) |
| RLC | Radio Link Control |
| RRC | Radio Resource Control |
| Rx | Receiver |
| S1 | Interface between an eNB and EPC (i.e. RAN and core network) |
| S5 | Interface between P-GW and S-GW |
| SDAP | Service Data Adaptation Protocol |
| SNR | Signal-to-Noise Ratio |
| Tx | Transmitter |
| UDP | User Datagram Protocol |
| UE | User Equipment |
| UL | Uplink |
| UPF | User Plane Function |
| Uu | The radio interface from the eNodeB to the UE (also known as the LTE-Uu interface) |
| X2 | Interface between two eNBs |
| Xn | Interface between two gNBs or between an eNB and gNB in non-EN-DC cases |

The invention claimed is:

1. A method, performed by a network node in a wireless communication system, for handling resource configurations for radio network nodes in an Integrated Access and Backhaul, IAB, network, the network node being connected to a core network of the wireless communications system and to at least one radio network node, the method comprising:

providing, to a first radio network node and to a plurality of second radio network nodes, a message indicating a resource configuration for the first radio network node, each of the plurality of second radio network nodes being a parent node to the first radio network node and the first radio network node being a child node to each of the plurality of second radio network nodes;

the providing the message indicating the resource configuration to the first radio network node including:

embedding the message including the resource configuration for the first radio network node in a message that is to be sent to the plurality of second radio network nodes, the embedded message being forwarded to the first radio network node by at least one of the plurality of second radio network nodes; and sending, to the plurality of second radio network nodes, the message including the resource configuration for the first radio network node, the message indicating the resource configuration to the first radio network node being an application protocol message that is sent over an F1 interface, and the embedded message being an F1 application protocol message.

2. The method according to claim 1, wherein the network node has a wired connection to the core network of the wireless communication system and a wireless connection to the at least one radio network node.

3. The method according to claim 1, wherein the resource indication message is an application protocol message, which is sent over an F1 interface.

4. The method according to claim 1, wherein both the embedded message and the message including the resource configuration for the first radio network node comprise the resource configuration for the first radio network node.

5. The method according to claim 1, wherein the embedded message is embedded in a transparent container in the message sent to the plurality of second radio network nodes.

6. A method, performed by a first radio network node in a wireless communication system, for handling resource configurations for radio network nodes in an Integrated Access and Backhaul, IAB, network, the first radio network node being connected to a plurality of second radio network nodes of the wireless communication system, the method comprising:

receiving, from each of the second radio network nodes, a resource indication message comprising the resource configuration for the first network node, each of the plurality of second network nodes being a parent node to the first network node; and the received message being an F1 application protocol message encapsulated in an adaption header including header information according to an F1 interface, such that the first radio network node handles the F1 application protocol message as an application protocol message received over an F1 interface.

7. The method according to claim 6, wherein the method further comprises:

applying the resource configuration.

8. A network node in a wireless communication system, for handling resource configurations for radio network nodes in an Integrated Access and Backhaul, IAB, network, the network node being connected to a core network of the wireless communications system and to at least one radio network node, the network node comprising processing circuitry being configured to:

provide, to a first radio network node and to a plurality of second radio network nodes, a message indicating a resource configuration for the first radio network node, each of the plurality of second radio network nodes being a parent node to the first radio network node and the first radio network node being a child node to each of the plurality of second radio network nodes;

the providing the message indicating the resource configuration to the first radio network node including:

embedding the message including the resource configuration for the first radio network node in a message that is to be sent to the plurality of second radio network nodes, the embedded message being forwarded to the first radio network node by at least one of the plurality of second radio network nodes; and sending, to the plurality of second radio network nodes, the message including the resource configuration for the first radio network node, the message indicating the resource configuration to the first radio network node being an application protocol message that is sent over an F1 interface, and the embedded message being an F1 application protocol message.

9. The network node according to claim 8, wherein the network node has a wired connection to the core network of the wireless communication system and a wireless connection to the at least one radio network node.

\* \* \* \* \*